Figure 1:
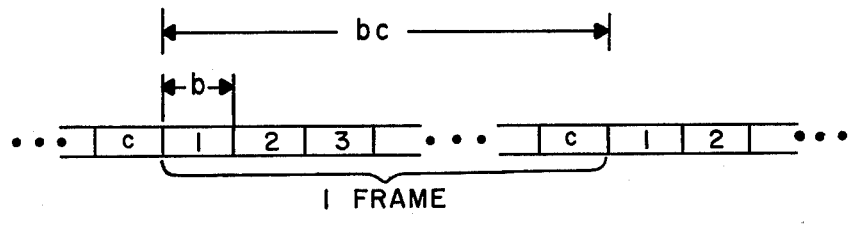

United States Patent [19]

Collins et al.

[11] 4,038,497

[45] July 26, 1977

[54] HARDWIRED MARKER FOR TIME FOLDED TST SWITCH WITH DISTRIBUTED CONTROL LOGIC AND AUTOMATIC PATH FINDING, SET UP AND RELEASE

[76] Inventors: Arthur A. Collins, 13731 Danvers Drive; John C. Bellamy, II, 7605 Chattington, both of Dallas, Tex. 75240; Richard L. Christensen, 22 Bunker Hill, Richardson, Tex. 75080

[21] Appl. No.: 576,451

[22] Filed: May 12, 1975

[51] Int. Cl.² .............................................. H04J 3/00
[52] U.S. Cl. .............................................. 179/15 AT
[58] Field of Search ....... 179/15 AT, 15 AQ, 18 GF, 179/18 ES, 18 J

[56] References Cited

U.S. PATENT DOCUMENTS

| | | | |
|---|---|---|---|
| 3,657,483 | 4/1972 | Bosonnet | 179/15 AT |
| 3,736,381 | 5/1973 | Johnson | 179/15 AQ |
| 3,743,789 | 7/1973 | Krupp | 179/15 AT |
| 3,754,100 | 8/1973 | Jacob | 179/15 AQ |
| 3,840,704 | 10/1974 | Baugh | 179/15 AQ |
| 3,851,105 | 11/1974 | Regnier | 179/15 AT |

*Primary Examiner*—Kathleen H. Claffy
*Assistant Examiner*—Joseph Popek
*Attorney, Agent, or Firm*—Warren H. Kintzinger

[57] ABSTRACT

A marker circuit communicating with a stored program controller and switch stages, implementing pathfinding, connect, and disconnect operations while using address, status, and data buses to control the switch through exchange of connect information from the stored program controller and disconnect information from the switch control stores.

23 Claims, 18 Drawing Figures

PATH SEARCH LOGIC

DISCONNECT SELECTION LOGIC

HARDWIRED MARKER FOR TIME FOLDED TST SWITCH WITH DISTRIBUTED CONTROL LOGIC AND AUTOMATIC PATH FINDING, SET UP AND RELEASE

This invention relates in general to switching path selection and control through switches used in interconnecting digital Time Division Multiplex (TDM) communication lines, and, in particular, to a hardwired marker circuit system for time space time (TST) telecommunication system switches and particularly for time folded TST switches interconnecting TDM communication lines. A time folded TST switch concept is taught and claimed in co-pending Application, Ser. No. 497,214, filed Aug. 14, 1974 with two of the joint inventors here being also two of the joint inventors thereof; and a TST switch with combined and distributed state store and control is presented in a co-pending Application Ser. No. 514,828, filed Oct. 15, 1974, with the joint inventors thereof being the joint inventors here.

Time Space Time (TST) switches are a particularly useful configuration of switching elements providing both time and space translation between channels of Time Division Multiplexed (TDM) telecommunications transmission lines. A TST switch interconnects digital bi-directional TDM communication lines with TDM communication involving the sharing of single transmission paths, individually, in time to provide multiple channels in a single transmission medium. This is a fundamental system improvement in telephone communication that should prove helpful in reducing the cost of orindary telephone service and in enhancing the ability to provide many new kinds of service in meeting expanded communication needs. Electro-mechanical crossbar and relay switching systems, as generally used today in telecommunications switching have, for practical purposes, reached the limits of their capabilities. Extensive, continued, adherence to these older technologies severely restricts capability and greatly increases costs of telecommunication systems, and this is particularly so with expansion to systems of great size and complexity. While many advances have been made in capability and efficiency in the transmission area with microwave, satellite, and high-capacity cable-and with both analog and digital repeaters and terminals being used, the exchange plant, including switching equipment in central offices and branch exchanges, remains, in essence, the same as in the very early days. Recent advances in solid state technology make the use of all digital switching and transmission techniques more attractive today than ever before.

The advent of digital multiplex transmission systems gives rise to many possibilities; particularly with TDM multiplex terminals beginning to look like switches. Message signals in these terminals appear in "time slots," and transfer of signals between time slots is accomplished by a "time slot interchange," with time division switches connected directly to multiplex transmission lines. Another important saving is accomplished through elimination of digital-to-analog, and analog-to-digital, conversions of every switch. The existing local exchange area plant represents the major part of telephone plant investment. It is the least efficient portion of such systems, and a portion that requires large quantities of scarce materials. Further, physical congestion problems are encountered with entrance cables as they approach the central office, and many times there are difficult growth problems in central office main distribution frames. Present central office switching includes bulky electromechanical switching stages located in large, costly building space. Costs for new construction and maintenance of such traditional exchange are plants are constantly increasing, particularly with large cable networks employed when cable pair utiliziation is inherently very low with a dedicated physical wire pair used to connect each subscriber station to its central office. Thus, system improvements attainable with time division transmission and switching techniques are very significant. This has led to Time Space Time (TST) switching structures, and, with some TST switches, an improved "folded" operation configuration. Folded operation TST switches using hardwired marker circuits are provided not only with a single stage square switch as a single space switch stage, but also as larger switches having multiple state space switching sections. Connect and disconnect procedures are simpler with marker circuit enhanced folded operation TST switches since a second path is automatically specified whenever the first path is selected. Thus only one pathfinding operation is required in a folded switch, and the disconnect procedure is simpler since both paths can be released simultaneously. Blocking problems are reduced one-half with a second path through the switch automatically available when an idle first path is found. Further, control information for the two paths can be shared, thereby providing some economy in the size of the control store.

The hardwired TST switch controller marker circuit achieves automatic connection set up in accordance with time folded operation, responds to disconnects in automatically updating appropriate control stores, and generates the necessary control signals for a time folded switch operation. Although a hardware implementation of the third function is required for any computer-controlled switch, the first two functions have been implemented with software in a control processor. Hardware implementation of the first two functions greatly reduces switching delays associated with connection set up and take down. Furthermore, since the routine tasks associated with each connection have been removed from software, the call processing load is reduced, and the switch processor can therefore be concerned primarily with specialized service requests. Thus if telecommunication networks are to grow and be capable of providing new services, it is necessary that routine functions be implemented with hardware.

It is therefore a principal object of this invention to provide, through use of a hardwired marker circuit system with time space time (TST) switches, implementation of routine functions with hardware.

Another object is to achieve a significant reduction of switching delays associated with connection set up and take down.

A further object is to reduce the call processing load and to allow the switch processor, of TST switches equipped with such hardwired marker circuits, to be concerned primarily with specialized service requests.

Still further objects with such a hard wired TST switch controller marker circuit are automatic connection set up in accordance with time folded operation, response to disconnects in automatically updating the appropriate control stores, and generation of the necessary control signals for time folded TST switch operation.

Features of this invention useful in accomplishing the above objects include, in a hardwired marker for time folded TST switches with distributed control logic and automatic path finding, set up and release, the selectively controlled interconnection of digital time division multiplex (TDM) communication paths with automatic connection set up consistent with time folded operation, response to disconnects with automatic updating of appropriate control stores, and generation of the control signals required for time folded switch operation. The marker circuit receives connect requests in a connect request register. A pathfinding operation is accomplished in applying certain control function parameters during an even time slot and, if an idle path is found, performing a write operation and applying various function parameters during the following odd time slot of which time another write operation is performed for completing both halves of the connection. Path search logic is implemented following a Boolean equation in status variables. Status of both time and space switch stages are fed to the marker circuit. Further, the marker disconnect selection logic uses a priority encoder in achieving desired disconnects with appropriate control timing of a clock, and then provides disconnect information in a connect complete register.

Figure 2:
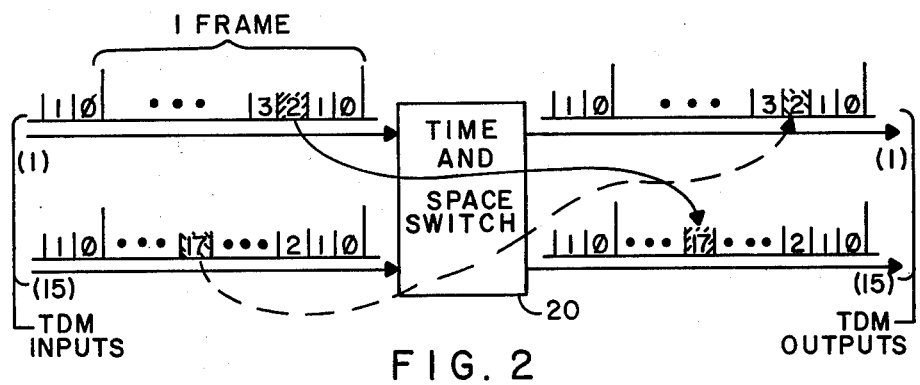
Figure 3:
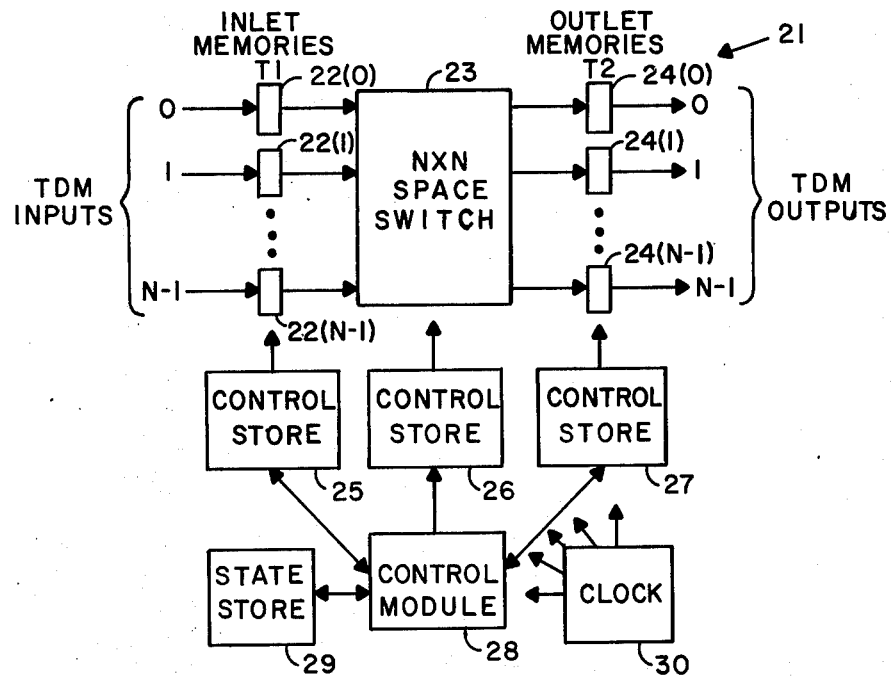
Figure 4:
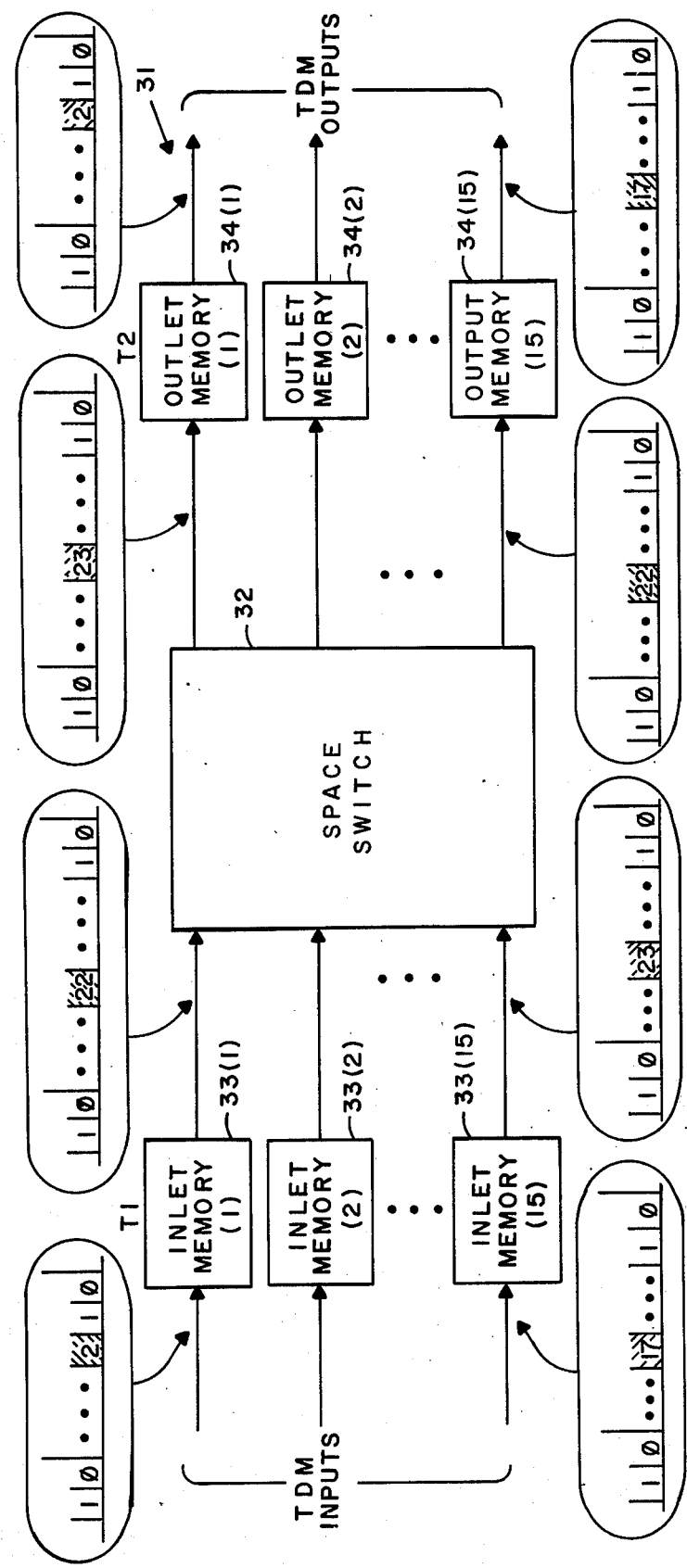
Figure 5:
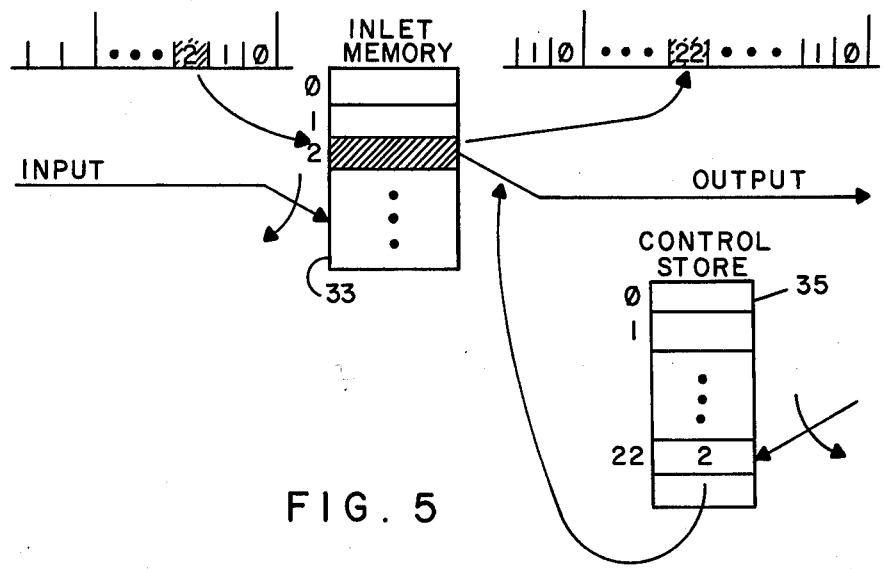
Figure 6:
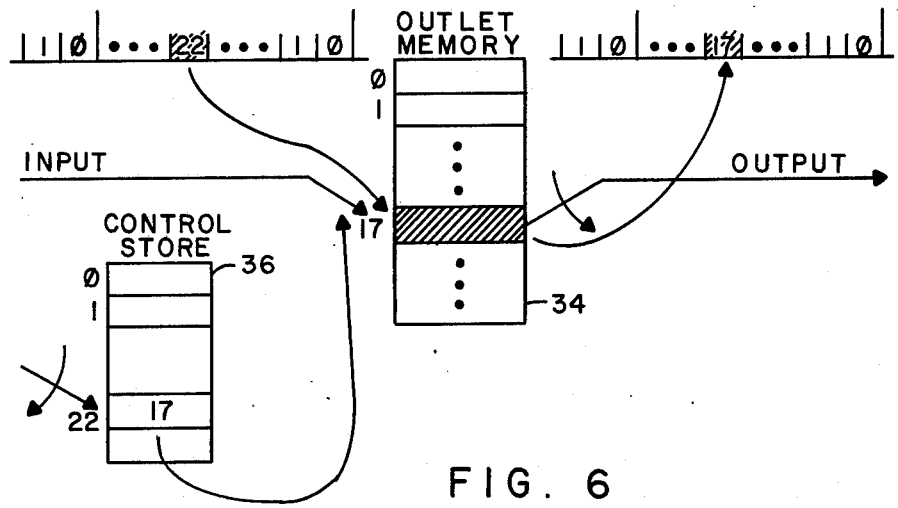
Figure 7:
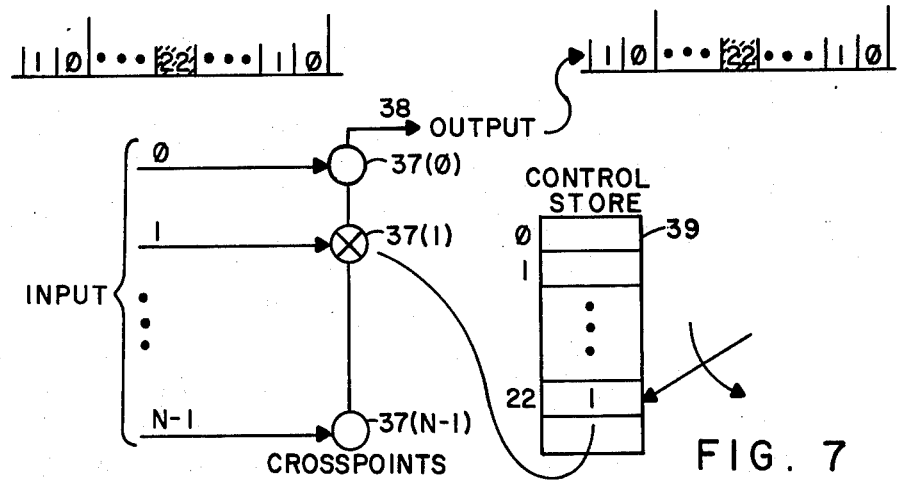
Figure 8:
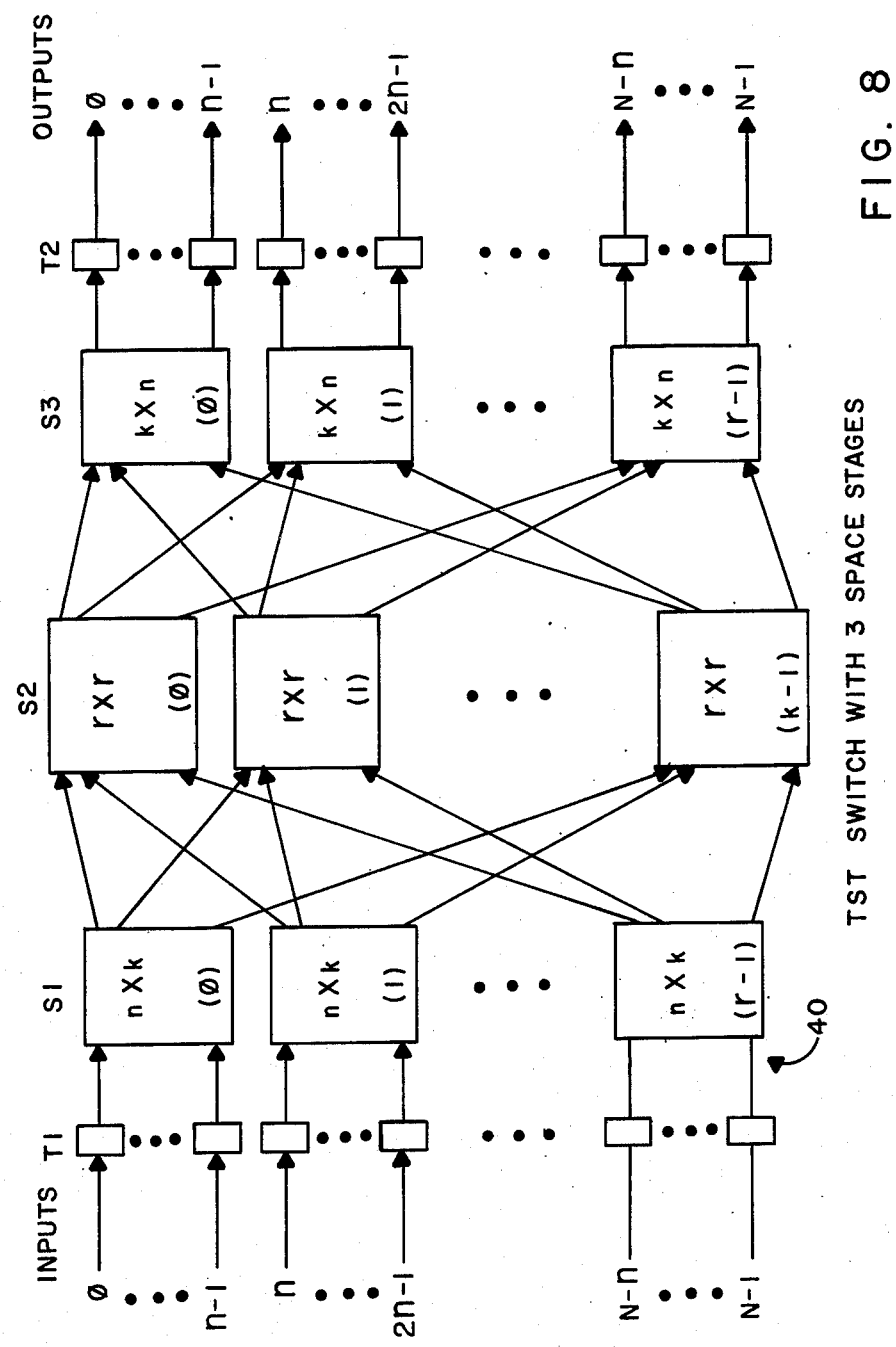
Figure 9:
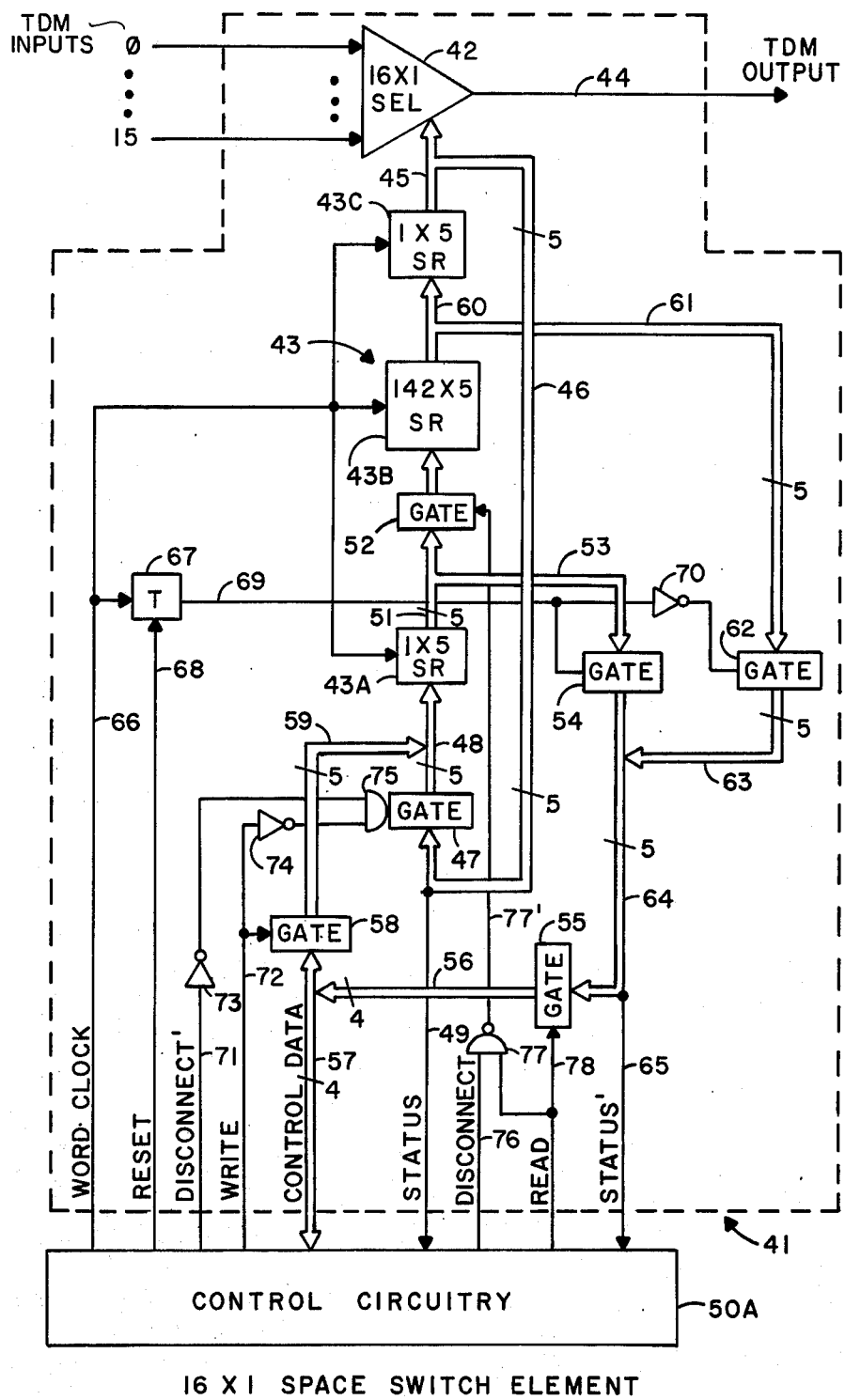
Figure 10:
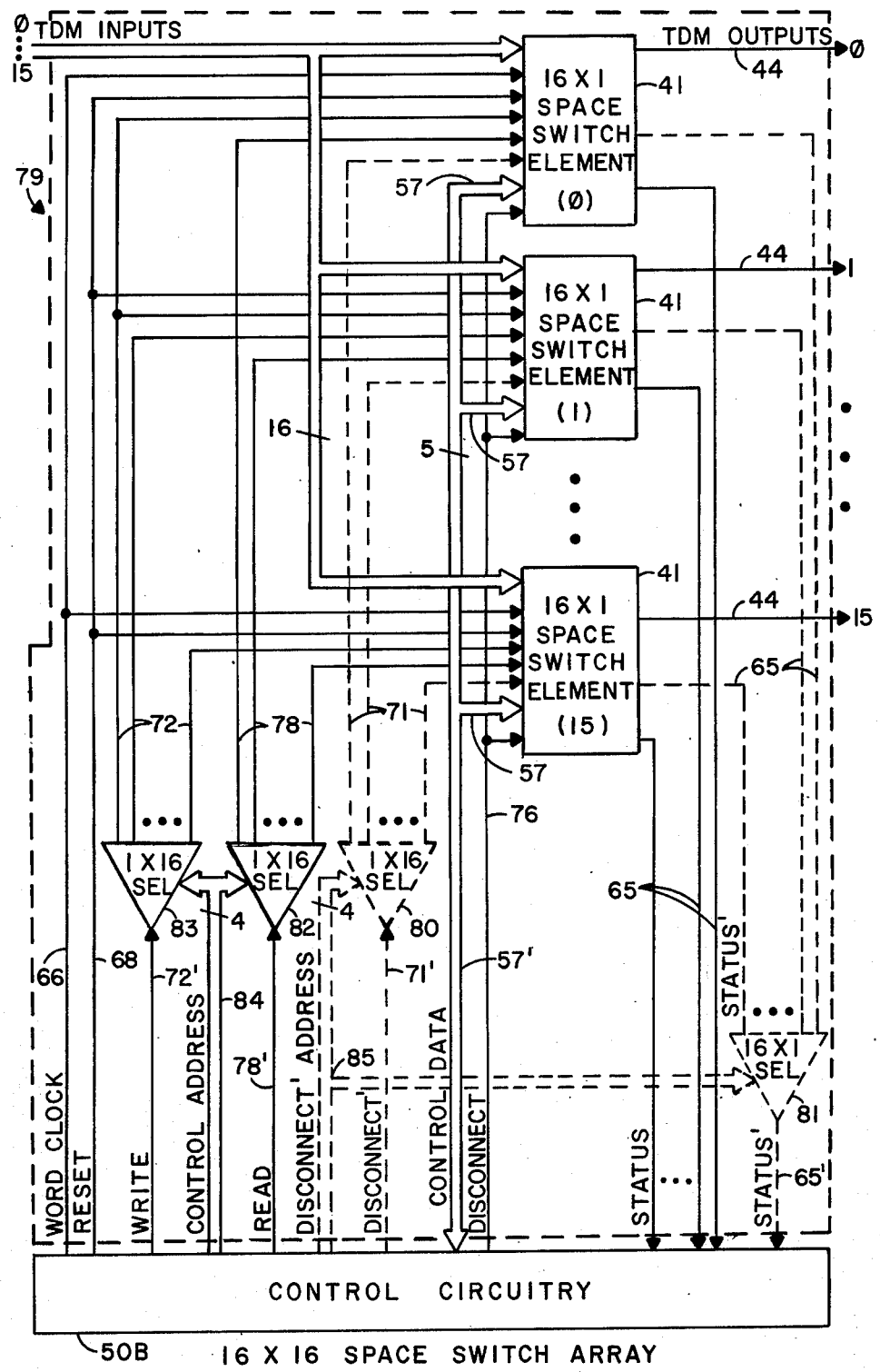
Figure 11:
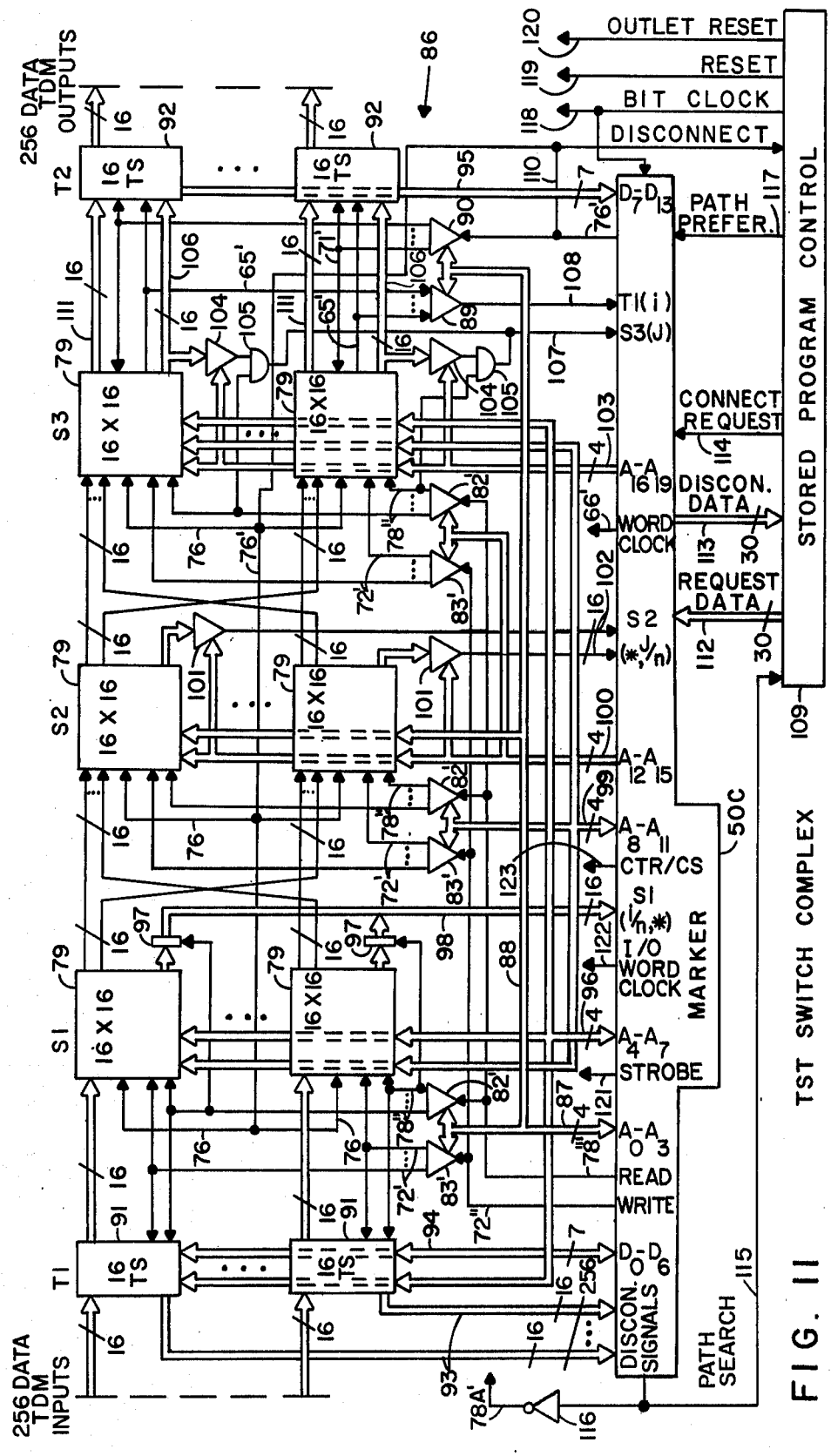
Figure 12:
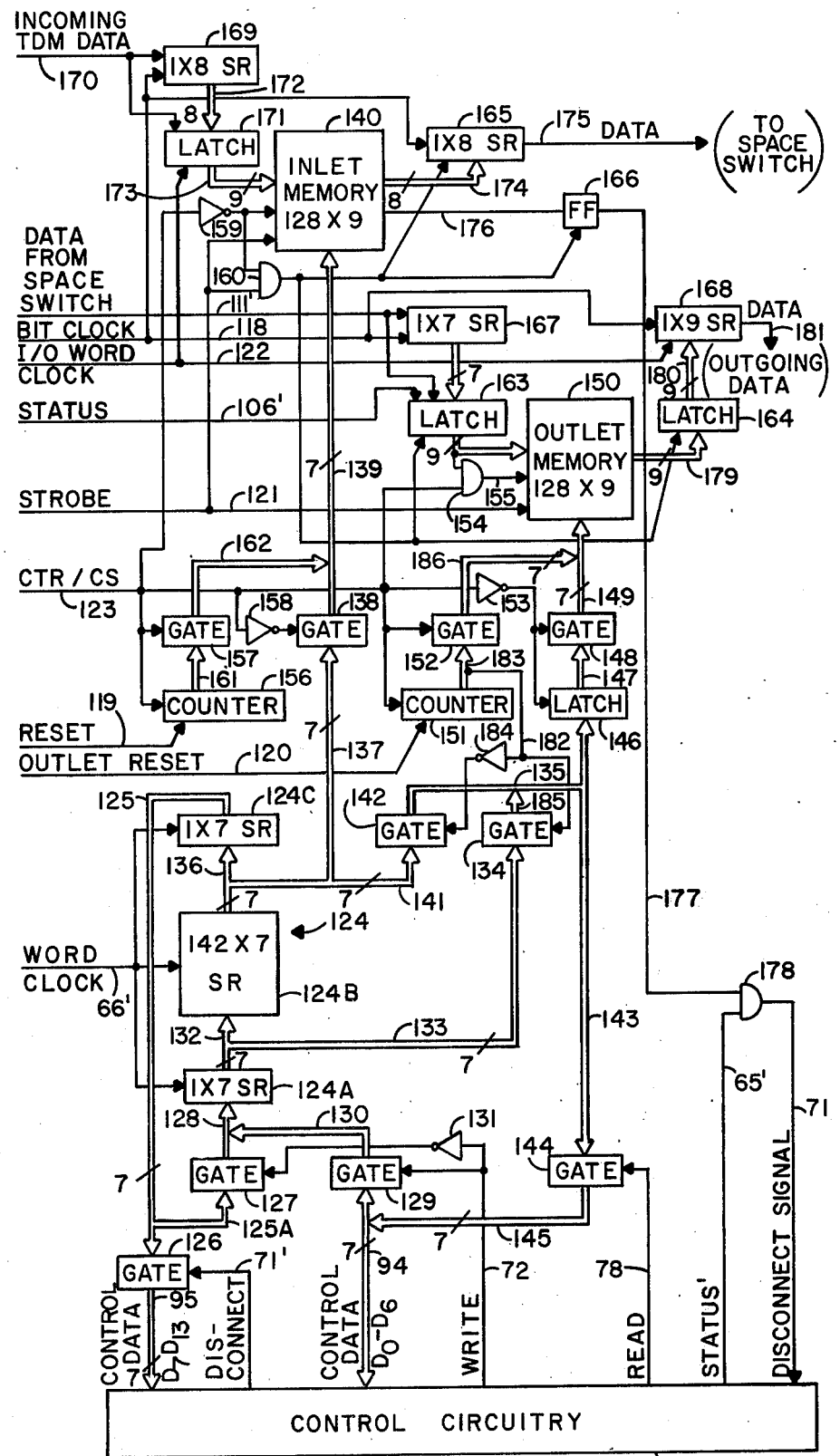
Figure 13:
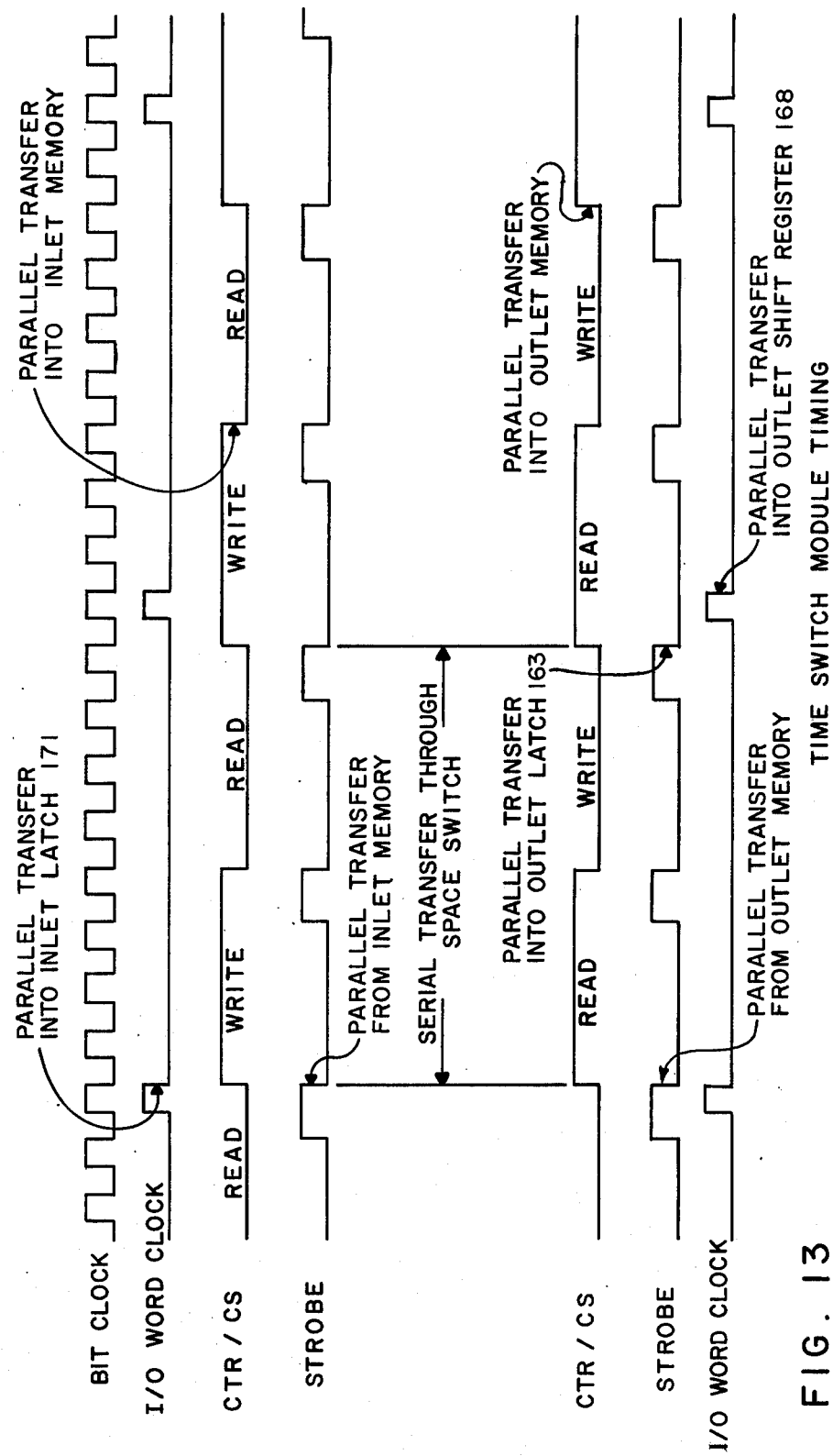
Figure 14:
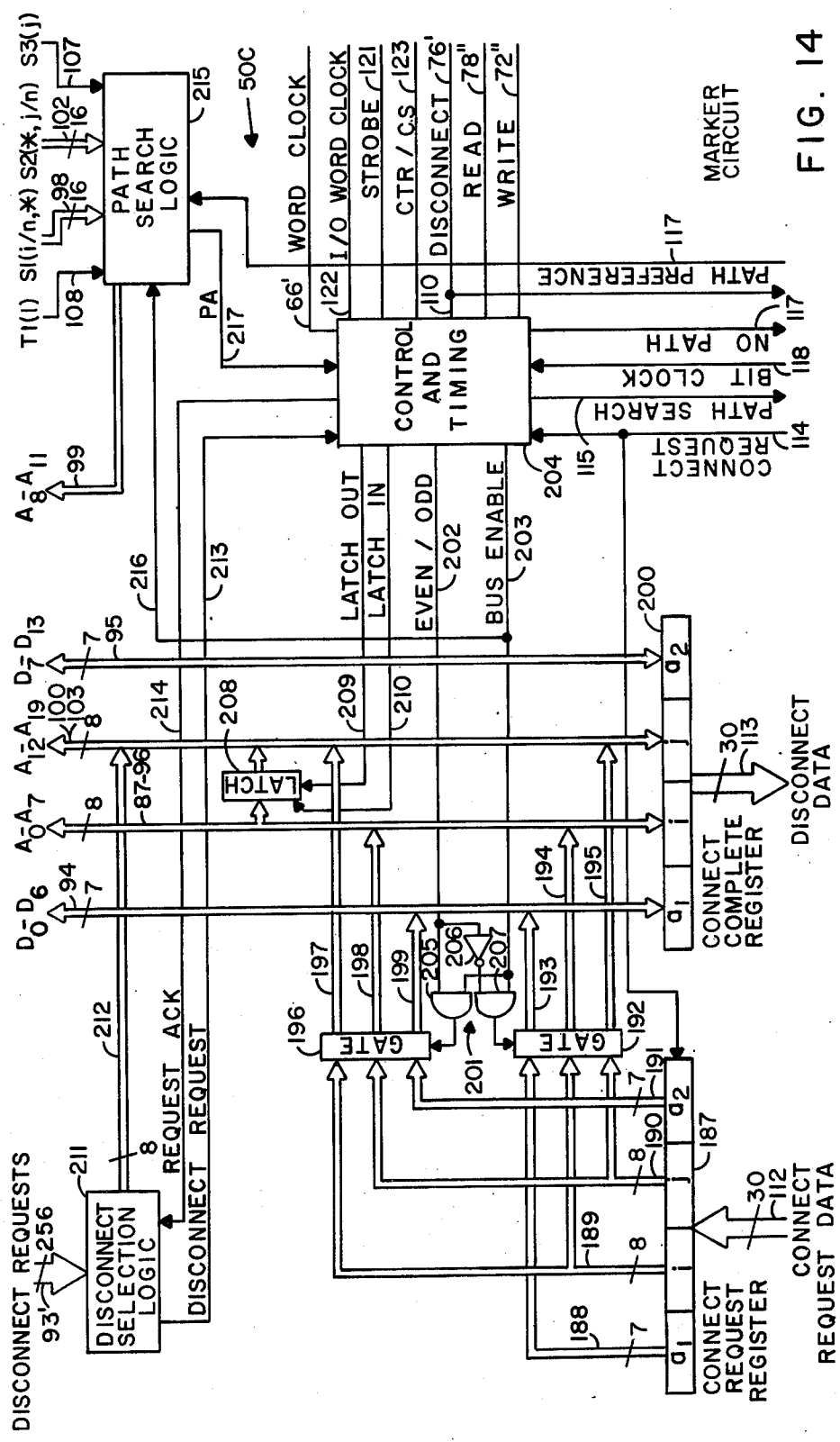
Figure 15:
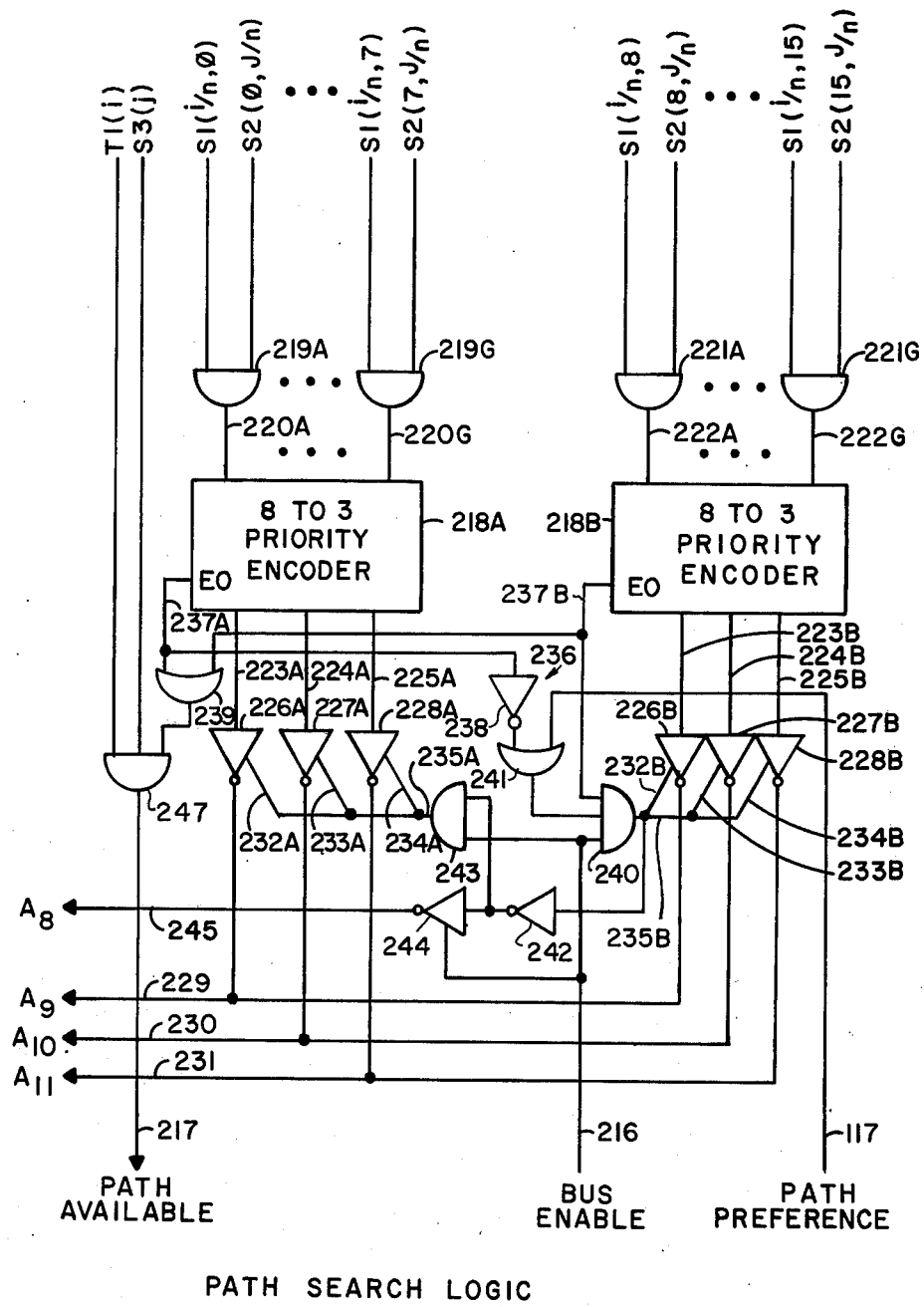
Figure 16:
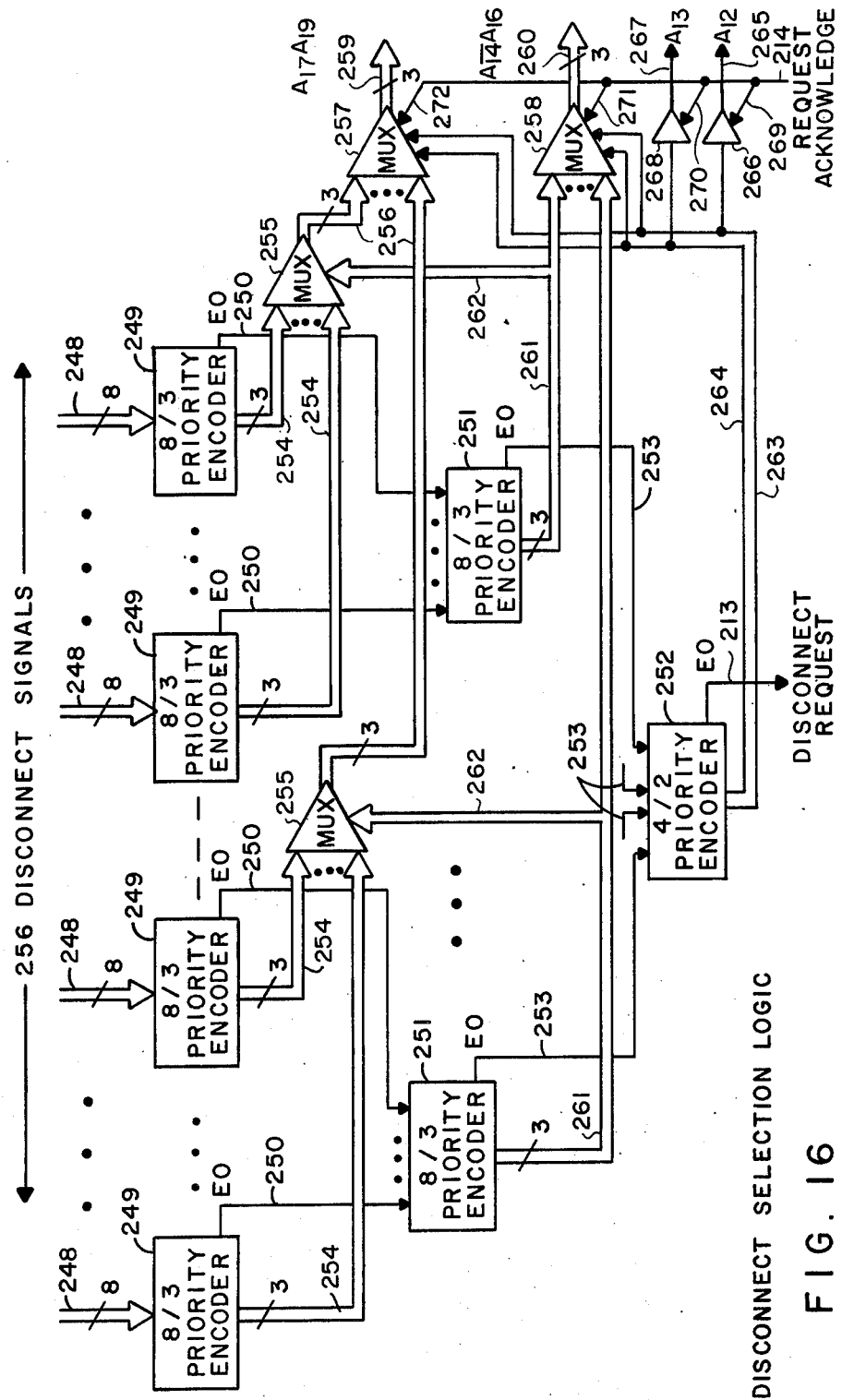
Figure 17:
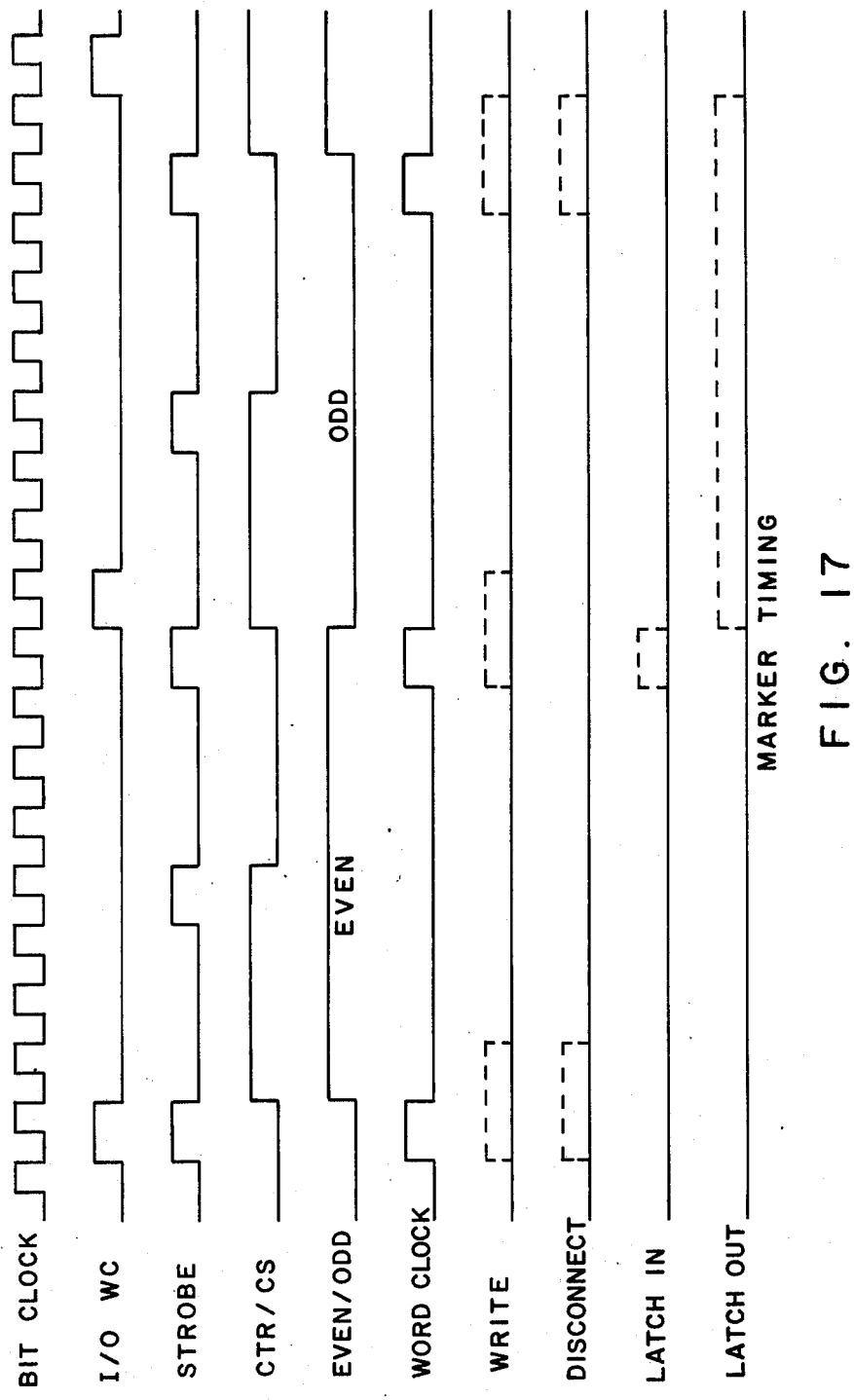

A specific embodiment representing what is presently regarded as the best mode of carrying out the invention is illustrated in the accompanying drawings wherein:

FIG. 1 represents a graphic showing of a format for time division multiplexing (TDM) of digital data;

FIG. 2, a combination graphic and schematic block showing of a TDM input/output time and space switch unit;

FIG. 3, a block schematic showing of a basic TST switch configuration with control elements also indicated;

FIG. 4, a block schematic showing of a basic TST switch such as shown in FIG. 3, with TDM channel content indicated for various pertinent input and output locations with time folded operation of the TST switch;

FIG. 5, a graphic conceptual showing of a time switch inlet memory and TDM channel content translation in time through the memory with associated control store direction;

FIG. 6, a graphic concepted showing of a time switch outlet memory and TDM channel content translation in time through the memory with associated control store direction;

FIG. 7, a graphic conceptual showing of space switch operation with associated control store direction;

FIG. 8, a block schematic showing of a TST switch with three space stages and notation for system operation description;

FIG. 9, a block schematic and graphic showing a a time division space switch element;

FIG. 10, a block schematic of a TDM space switch using a plurality of the space switch elements of FIG. 9;

FIG. 11, a block schematic and graphic showing of a three stage 256 > 256 space switch equipped TST switch having marker circuit control;

FIG. 12, a block schematic and graphic showing of time switch element interconnect and control for both inlet and outlet memory stage sections of a TST switch without any showing of the space staging;

FIG. 13, inlet memory and outlet memory timing diagram;

FIG. 14, a block schematic and graphic showing of a marker circuit for the TST switch of FIG. 11;

FIG. 15, a block schematic showing of the path search logic portion of the marker circuit of FIG. 14;

FIG. 16, a block schematic and graphic showing of the disconnect selection logic portion of the marker circuit of FIG. 14;

FIG. 17, switch and marker circuit timing waveforms; and

Figure 18:
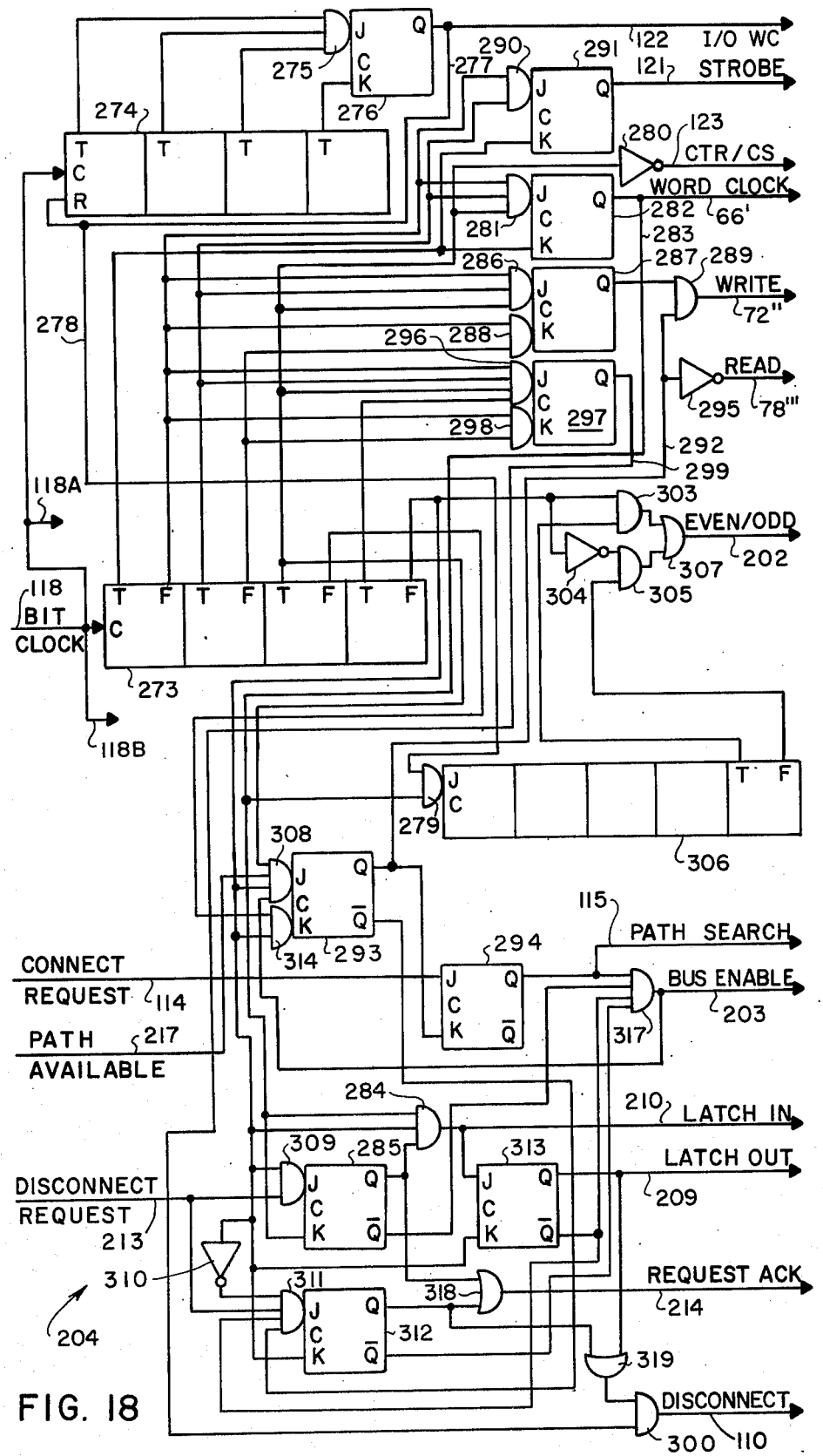

FIG. 18, a block schematic showing of the control and timing logic circuit portion of the marker circuit of FIG. 14 used to generate the various timing signal waveforms of FIG. 17.

Referring to the drawings:

Switching path selection and control through switches used in interconnecting digital Time Divisional Multiplex (TDM) communication lines are important operational functions optimized through use of applicant's new hardwired marker system used with time space time (TST) telecommunication system switches. Since the hardwired marker system is particularly useful in implementing signal path selection and control with time folded TST switches, a description of a basic TST switch and its operation is provided along with description of time folded TST switches. TST switches are designed to interconnect a number of digital Time Division Multiplex (TDM) communication lines with TDM involving the sharing of individual single transmission paths in time. This is with $c$ communication channels established by dividing time into $c$ slots. Thus, as shown in FIG. 1, each set of $c$ time slots constitutes a frame during which each communication is allowed to send a data word of $b$ bits. In typical digital voice systems, 8-bit words are generated at an 8 KHz rate and, thereby, a pair of 1.536 mbps transmission links are capable of carrying 24 separate conversations. Similarly, an 8.192 mbps link could accommodate 128 64 kilobit per second channels. When such communication channels are switched from one TDM transmission link to another, both time and space translations are required, such as illustrated in FIG. 2. In FIG. 2, TDM inputs 1 and 15 of a plurality of input lines, are shown to feed time and space switch 20 with TDM outputs 1 and 15 of a plurality of output lines emanating therefrom. Channel 2 of TDM input line 1 is connected to channel 17 of the TDM output line 15, and with full duplex communication requiring a two-way circuit, a second connection path is established, as indicated by the dotted line, transferring channel 17 of TDM input line 15 to channel 2 of TDM output line 1. A procedure for operating a digital time division switch such that both connections are automatically established in one operation, with the second path a mirror image of the first path in a folded operation, is described in greater detail hereinafter, particularly, "time folded" operation for TST switches.

A basic TST switch configuration 21 is shown in FIG. 3, with the first stage T1 of the switch being N inlet memories (actually 0 through N−1) 22(0), 22(1) . . . 22(N−1) one for each of the 0 through N−1 TDM inputs, respectively. The $c$ channel words from each input are stored in $c$ successive addresses of the respective inlet memories with these words then held in the memories until they are transferred through the space switch 23 to the outlet memories 24(0), 24(1) . . . 24(N−1) in the third stage T2, space switch 23 actually being the second stage, where the words are held in outlet memories until they are released on respective 0 through N−1 output TDM lines. Hence, the first stage represents a time switch in that data occurring in the input channels is translated in time to a time slot during which the space switch 23 transfer takes place. The T2 outlet memories 24(0), 24(1) . . . 24(N−1) receive data words from space switch 23 and store them in addresses corresponding to the desired output channel with the time division outputs 0 through N−1 then obtaining their data by successive locations of respective outlet memories being addressed. Associated with each inlet memory, space switch stage output, and outlet memory, is a control memory that contains $l$ words corresponding to the $l$ time slots during which data is transferred through the space stage 23. The individual control memories may be separate or may be collected together in control stores such as control stores 25, 26, and 27, for the T1 inlet memories, the space switch 23 stage outputs, and the T2 outlet memories, respectively. The control store 26 specifies which space switch crosspoints are selected and control stores 25 and 27 specify which inlet and outlet memory locations are accessed during each switch time slot, with the control stores being accessed in cyclic fashion so that each connection is repeated, at the same time, during every frame.

Establishing a connection through a TST switch, from a selected inlet memory to a selected outlet memory, involves finding a time slot during which the selected inlet memory, the selected outlet memory, and an appropriate space path are idle. Thus, the pathfinding operation in a TST switch involves a time search as well as a space search. The space switch connections are time division multiplexed with $l$ time slots per frame, and when $l$ is greater than $c$, the switch is said to be operating with time expansion. The larger $l$ is, the more transfer opportunities there are through the space switch 23. Thus, for given size space switches 23, greater time expansions imply lower blocking probabilities, and for a non-blocking space switch 23 when $l$ is increased to $2c−1$ the TST blocking probability is reduced to zero.

The control module 28 sets up and takes down connections in response to requests and disconnects, acting through the control stores 25, 26, and 27. In setting up calls, the control module 28 accesses state store 29, that stores the status of every switching element during every switch time slot, to determine idle switching paths and available time slots. Then when an idle path is found the corresponding state store bits are set to "busy" and the appropriate information is loaded into the control stores. When discontinuing a connection, the control stores are accessed to determine which state store bits must be set to idle. Although FIG. 3 shows the state store 29 as being distinct from the control store 25, in some implementations it is desirable to incorporate both functions into one piece of equipment. In these instances the control information and the status of the respective switching element can be obtained by a single access to one device. Master clock is distributed to all switching elements, as indicated by the plurality of arrowed leads from master clock source 30, to synchronize the operation thereof. Thus the NXN space switch 23, that in FIG. 3 is a square switch with an equal number of inputs and outputs, is operated in time divided fashion in synchronism with the time stages. This is with all operations cyclic, so that data occurring in each time slot of successive incoming frames in transferred to the same time slot(channel) of successive outgoing frames.

The best structure of a space switch is dependent on the number of inputs and outputs it services. A single stage square space switch, such as the NXN space switch 23 of FIG. 3, is generally most attractive for small switches. Large switches, however, are more attractively implemented with multiple stages. Time folded operation TST switches with hardwired markers are particularly useful in all switch sizes with any number of space stages used.

Referring also to FIG. 4, the folded operation of TST switch 31 automatically sets up the second connection of a full duplex operation when the first connection is set up in a particularly useful fashion using successive switch time slots for the two connections That is, one space switch 32 transfer is made during an even time slot and the other transfer is made in a symmetric fashion during the following odd time slot, such as shown in FIG. 4, for a connection between channel 2 of line 1 and channel 17 of line 15. In the example shown, as a typical example, switching time slot 22 has been selected for the transfer from inlet 1 to outlet 15, with the time folded operation then using time slot 23 for the reciprocal transfer from inlet 15 to outlet 1. The T1 inlet memories 33(1), 33(2) . . . 33(15) are like the T1 memories 22 of FIG. 3, and the T2 outlet memories 34(1), 34(2) . . . 34(15) are like the T2 memories 24 of FIG. 3. The various elements of TST switch 31 are controlled by cyclicly retrieving control information from a set of memories, called control stores, just as with the embodiment of FIG. 3. New connections are established and old ones removed through updating of the information stored in the control stores, one of which is associated with each inlet memory, space stage output, and outlet memory. The control stores contain one word for each time slot, with the information stored in the words specifying which connections are established during the respective time slots.

The pathfinding operation of a time folded TST switch begins by searching all appropriate space paths during even time slots to complete a path from originating inlet 0 to terminating outlet N−1 through the TST switch of FIG. 3, as an example if an idle path is found, the corresponding connection from inlet N−1 to outlet 0 is automatically available during the next odd time slot. If no idle path from inlet 0 to outlet N−1 is found during an even time slot, then a path search from inlet N−1 to outlet 0 is begun by searching all appropriate space paths during even time slots. If an idle path is found, the corresponding connection from inlet 0 to outlet N−1 is automatically available during the following odd time slot. Notice that searching for a connection from inlet N−1 to outlet 0 during even time slots is equivalent to searching for a path from inlet 0 to outlet N−1 during odd time slots. Thus, all $l$ time slots are available for completing any particular full duplex connection even though the first half connection involves a search of only even time slots. Since the second half connection is always available when the first half connection is established, the time folded operation cuts the blocking probability to one-half that occurring if both halves of a connection are established independently. When switch elements for one path are marked busy during an even time slot, respective elements in the mirror image of the first path are marked busy during the following odd time slot. For example, when inlet 0 of FIG. 3 is marked busy during an even time slot, outlet 0 is marked busy during the following odd time slot. Since status of respective elements are related in this way, the state stores associated with the respective elements can be combined. This path-finding operation is applicable to all the time folded TST switch embodiments set forth herein or suggested by the teachings hereof.

Conceptual operation of an inlet memory is illustrated in FIG. 5, with data from successive channels (time slots) of the input stored in successive addresses of the inlet memory 33 (or, 22). Control store 35 is accessed in synchronism with the switching time slots to specify the desired inlet address. Using inlet 1 as an example, the data from incoming channel 2 is accessed during switch time slot 22 by storing the value 2 in control store location 22. Outlet memories, such as outlet memory 34 illustrated in FIG. 6, operate in a similar fashion except that the control stores 36 specify which memory address is written into during respective switch time slots. Outgoing data is then obtained by cyclicly accessing successive outlet locations for the corresponding output channels such as illustrated in FIG. 6, for outlet 15 of the example connection, through the TST switch 31 of FIG. 4. Data from the space switch is stored in location 17 during switch time slot 22. This data is then retrieved for transmission during output time slot 17. Note that outlet 34(1) in the example would store the value 2 in location 23 of its control store 36. Similarly, inlet 33(15), of FIG. 4, would store the value 17 in location 23 of its control store 35. Further, the information required by inlet 33(1) during time slot 22 is identical to the information required by outlet 34(1) during time slot 23. Similarly, the information required by inlet 35(15) during time slot 23 is identical to the information required by outlet 34(15) during time slot 22. Thus, by virtue of the time folded operation, respective inlet and outlet memories can share a control store by exchanging control information during alternate time slots.

The conceptual implementation of a switching element for time divided space switches, such as space switch 32 of FIG. 4 (or, space switch 23 of FIG. 3), is shown in FIG. 7. The switch element shown, usable as a basic building block for space switches with any number of stages, has a plurality of crosspoints 37($\phi$), and 37(1) through 37(N−1) for $\phi$ and 1 through N−1 inputs to one output line 38. Actually, there is plurality of output lines (detail not shown) within a square space switch, the number of output lines 38 equaling the number of input lines. Again, a control store (store 39) is accessed in synchronism with the switch time slots to select the desired inputs for each transfer. For example, with the single stage space switch 32 of FIG. 4, space stage output 15 would have value 1 stored in location 22 of its control store 39 (FIG. 7). Similarly, space stage output 1 would have the value 15 stored in location 23 of its control store (like store 39 in FIG. 7).

The basic configuration of a TST switch 40 in FIG. 8 is shown to have input memory staging $T_1$, a space switch section with three stages $S_1$, $S_2$, and $S_3$, and output memory staging $T_2$ with N inlet (outlet) memories subdivided into $r=N/n$ sets of $n$ memories each. The outputs of every inlet memory in a set are connected to an $n \times k$ crosspoint array of the first stage. Every array in the first stage is then connected to each of $k$ crosspoint arrays in the second stage. Every second stage array is then connected to each of the $k \times n$ third stage arrays with outputs in turn connected to their respective outlet memories. Notice that this configuration provides $k$ distinct space paths from each inlet memory to each outlet memory—one path through each of the $k$ center stages. To facilitate describing the operation in detail, this showing with some additional notation is presented with minimal numerical identifiers. A particular element within a stage is denoted by a zero origin subscript. Since the space stage arrays have multiple outputs, individual space stage outputs are denoted by two subscripts. Thus, the $j^{th}$ output of the $i^{th}$ array in the first space stage is denoted by S1($i,j$). Interstage connections of the switch are denoted by concaternating the designations of the originating and terminating stages respectively. A particular interstage link is denoted by specifying the particular source and destination elements. Thus, the link from the $i^{th}$ array in the second space stage to the $j^{th}$ array of the third space stage is denoted by S2S3($i,j$). The control stores associated with each element are signated by appending the letters CS to the respective element designation. Thus, the control store for the $i^{th}$ inlet memory is denoted by TICS($i$). Similarly, the control store associated with the $j^{th}$ output of the $i^{th}$ array in the first space stage is denoted by S1CS($i,j$).

The successive sets of $n$ inlets to switch 40 of FIG. 8 are connected to successive arrays within S1. That is, inlets 0, 1 . . . $n-1$ are connected to S1(0), inlets $n$, $n+1$ . . . $2n-1$ are connected to S1(1), etc. As a convenience in designating which inlet is connected to which first stage array, the notation $i/n$ is used to denote truncated division of $i$ by $n$. Thus, the $i^{th}$ inlet memory is connected to S1($i/n$). As another convenience, the notation $i/n$ is introduced to denote the remainder of $i$ divided by $n$. That is, $i/n = i$ modulo ($n$) or more commonly $i/n = i$ mod ($n$). (Notice that $/n = i - n[i/n]$). This notation is useful in designating which particular input within a first stage array is connected to which inlet. Thus, inlet T1($i$) is connected to the $(i/n)^{th}$ input of the $(i/n)^{th}$ array in S1. Similarly, the $j^{th}$ outlet T2($j$) is connected to the $(j/n)^{th}$ output of the $(j/n)^{th}$ array in S3. As a specific example, consider the case where $N = 256$ so that $i$ is encoded with 8 bits. Furthermore, assume that $n = 16$ and is therefore encoded with 4 bits. Then, $i/n$ merely signifies the four most significant bits of $i$ while $i/n$ signifies the four least significant bits of $i$. Thus, individual space stage inputs and outputs are specified in a hierachical fashion where the four most significant bits ($i/n$) denote an array or level within a stage and the four least significant bits ($i/n$) denote a particular input or output within the level.

With the above notation, a space path between inlet memory $i$ and outlet memory $j$ can be specified as the sequence of links:

$$\text{SPACE PATH} = T1S1(i) \rightarrow S1S2(i/n,s) \rightarrow S2S3(s,j/n) \rightarrow S3T2(j) \quad (1)$$

The entries in the control stores corresponding to the above connection are tabulated as follows, with index $t$ designating a particular switch time slot:

| | | |
|---|---|---|
| T1CS($i,t$)=$a_1$ | (inlet address) | (2) |
| S1CS($i/n,s,t$)=$i/n$ | (S1 input) | (3) |
| S2CS($s,j/n,t$)=$i/n$ | (S2 input) | (4) |
| S3CS($j/n, j/n,t$)=$s$ | (S3 input) | (5) |
| T2CS($j,t$)=$a_2$ | (outlet address) | (6) |

Each occurrence of $t$ designates the address of the control store in which the specified information is stored. The above information is obtained for each occurrence of time slot $t$. The words in T1CS($i,t$) and T2CS($j,t$) designated as $a_1$ and $a_2$, respectively, represent time stage memory addresses. Thus, the above notation specifies a connection from channel $a_1$ of input line $i$ to channel $a_2$ of output line $j$. Specifications (2) through (6) identify a single path through a TST switch. Again, a full duplex connection through the switch requires two paths. In a folded three-stage space switch, the second path uses the same center stage array as the first path and transfers during the next time slot. Thus, the following relationships completely specify a full duplex connection using switch time slot $t$:

$$PATH(a) = T1S1(i,t) \rightarrow S1S2(i/n,s,t) \rightarrow S2S3(s,j/n,t) \rightarrow S3T2(j,t) \quad (7a)$$
$$PATH(b) = T1S1(j,t+l) \rightarrow S1S2(j/n,s,t+1) \rightarrow S2S3(s,i/n,t+1) \rightarrow S3T2(i,t+1) \quad (7b)$$

Table 1
Path Specification and Control Information
for Full Duplex Connection in Folded Switch

| | | | |
|---|---|---|---|
| T1CS(i,t)=$a_1$ | T2CS(i,t+1)=$a_1$ | (8a) | (8b) |
| S1CS(i/n,s,t)=i/n | S3CS(i/n, i/n,t+1)=s | (9a) | (9b) |
| S2CS(s,j/n,t)=i/n | S2CS(s,i/n,t+1)=j/n | (10a) | (10b) |
| S3CS(j/n,j/n,t)=s | S1CS(j/n,s,t+1)=j/n | (11a) | (11b) |
| T2CS(j,t)=$a_2$ | T1CS(j,t+1)=$a_2$ | (12a) | (12b) |

The time division space switch element circuit 41 of FIG. 9 includes a switching mechanism with a 16 to 1 selector 42 controlled by the output of a 144 × 5 end around shift register 43 that is split into three sections, 43A, 43B, and 43C in order to provide access to specific control information at the interconnects between sections required for automatic disconnect operation. The 144 × 5 end around shift register 43 has its 1 × 5 output section 43C output connected to selector 42 to selectively connect one of $\phi$ through 15 TDM inputs to the single TDM output line 44. The 144 × 5 end around shift register 43 constituting a control store is also connected through recirculation loop 46 to gate 47 and through gate 47 and five-line bus 48 to the 1 × 5 input section 43A of end around shift register 43. The recirculation loop 46 is also provided with a a single line, of its five lines, status interconnect 49 to control circuitry 50A.

Each control word contains five bits which allow 32 distinct codes. In this example, 16 codes are used for specifying an active connection and the set of 16 remaining codes (designated by a fifth bit equal 0) specify idle status. If a single code is used to designate idle status, requiring decode logic for the status output, then the remaining codes could be used to select one of 31 inputs.

The five-line bus 51 of the 1 × 5 shift register section 43A is connected to and through gate 52 to the input end of 142 × 5 shift register section 43B. Bus 51 also has a five-wire branch loop 53 connected to and through gate 54 to gate 55. A four-wire but 56 extension extends from gate 55 to a connection with four-wire, two-way, control data bus 57 interconnecting control circuitry 50A and gate 58. The five-line bus 59 connected to bus 48. The five-line bus 60 out of 142 × 5 shift register section 43B is connected to the input end of shift register section 43C and has a five-wire branch loop 61 connected to and through gate 62 to five-wire bus extension 63 to the five-wire bus section 64 of branch loop 53 from gate 54 to gate 55. Bus section 64 is provided with a single line, of its five lines, status' interconnect 65 to control circuitry 50A. Word clock is fed through line 66 directly to the shift register sections 43A, 43B, and 43C and toggle flip-flop 67. A reset input is fed through line 68 to toggle flip-flop 67 to initialize the toggle flip-flop when power is first applied to the circuit. The toggle flip-flop 67, through its output line 69 directly to gate 54 and through inverter 70 to gate 62, together with gates 54 and 62, selects the previous and next control words during odd and even time slots, respectively. Whenever the READ input is a 1, the information so selected is gated onto the control data bus 57. Disconnect' and write signals from control circuitry 50A are passed through lines 71 and 72 and inverters 73 and 74, respectively, to the AND gate 75 control input of gate 47, and line 72 is also connected directly to gate 58. Disconnect signals from control circuitry 50A are passed through line 76 to NAND gate 77 and read signals are passed through line 78 both to gate 55 and to the NAND gate 77 having an output connection through line 77' to gate 52.

With the shift register 43 separated in two places as a three-section 43A, 43B, and 43C shift register control store instead of being implemented as a straight 144 × 5 end around shift register the two separation places provide access to specific control information required for automatic disconnect operation. During any particular time slot, the data entering section 43C is the information to be used during the next time slot. Similarly, the data entering section 43B is the control information used during the previous time slot. Automatic disconnects are effected during odd time slots by setting the appropriate control words of the previous time slot to idle. Thus, gate 52 has been included to block recirculation of the previous control word when the disconnect and read inputs are 1 to force the status bit of the control word to 0 indicating on idle state.

The last stage S3 of a space switch array, such as shown with the TST switch of FIG. 8, has outputs connected in one-to-one fashion to inputs of the outlet time stage T2. Thus, each control store for the last space stage S3 not only stores status for itself, but also for the associated inlet and outlet memory pair. Since two inlet/outlet pairs are involved in each connection, two control words of the last space stage must be set to IDLE when performing a disconnect. One of these actions is accomplished as described above for the outlet memory that was accessed during the previous (even) time slot. The outlet memory that is accessed during the current time slot is set to IDLE by setting the control word of the corresponding third stage output to IDLE during the current (odd) time slot. This action is accomplished by setting the DISCONNECT' input to 1 which blocks the normal recirculation process through gate 47. Notice that the recirculation process is also blocked when the WRITE input is a 1 so that new data can be loaded into the bottom of the shift register through gate 58.

The pathfinding operation is performed during even time slots using appropriately selected STATUS outputs from each switch element. These outputs are obtained as the fifth bit of the current control word, with only four bits being used to select one of 16 inputs, and with the remaining bit being used solely for status. The last space stage (S3) also stores status of respective inlet/outlet memory pairs. Thus, for those space switch elements used in the last stage, a STATUS' output provides status of the next (odd) time slot, which also represents the respective inlet memory during the current (even) time slot.

This is consistent with operation of the switching mechanism having, with each occurrence of a clock pulse, the stepping of a new 5-bit control word to the top of the shift register 43. This new control word then specifies a new connection that is held while message data is being gated through 16 × 1 selector 42 from the selected TDM φ. . . 15 input to the data output line 44. Whenever a word clock pulse occurs, the current control word is circulated to the bottom of the shift register 43 to thereby repeat each connection once every 144 clock pulses.

A complete switching array implemented through interconnecting a plurality of the time division switch element circuits 41 of FIG. 9 is shown in FIG. 10 as 16 × 16 time division space switch 79. Sixteen 16 × 1 element circuits 41 are used with each 16 to 1 matrix selector 42 input connected to a corresponding input of every element, and the 16 distinct outputs φ through 15 are individually controlled by their respective control stores. The 16 × 16 time divided space switch 79 can be used as a building block for multiple stage space switches, however, portions indicated in dotted lines must be added for and pertain only to last space stage applications. Thus, the connections and the 1 × 16 selector 80 and 16 × 1 selector 81 indicated by dotted lines are not needed in the first and second stage arrays of a three-stage space switch. With respect to all space stages READ line 78″ and READ ENABLE line 78A are connected through AND gate 81A to line 78′ which is fanned out selectively to 16 READ lines 78 through the switching mechanism of 1 to 16 selector 82, and WRITE line 72′ from control circuitry 50B is fanned out selectively to 16 WRITE lines 72 for individual switch element circuits 41 through the switching mechanism of 1 to 16 selector 83. The 1 to 16 selectors 82 and 83 are controlled by control inputs from control circuitry 50B passed through control address bus 84 to the selectors 82 and 83. Control data links 57, of individual switch element circuits 41 to and from control data bus 57′, interconnect control ccircuitry 50B and the switch element circuits 41. Word clock line 66 is connected from control circuitry 50B to the switch element circuits 41. The 1 × 16 selector 80 and the 16 × 1 selector 81 are controlled by control inputs from control circuitry 50B passed through control bus 85. These, respectively, route disconnect′ line 71′ control signals to respective lines 71 of control selected 16 × 1 space switch elements 41, and select specific status′ line 65 outputs of switch elements 41 for transmission through status′ line 65′ to control circuitry 50B.

In providing the S1, S2, and S3 256 × 256 three-stage time divided space switch staging in TST switch 86 of FIG. 11, 16 of the 16 × 16 time division space switches are used in each of the three stages, 48 in all—32 in the S1 and S2 stages in the form of FIG. 10 without the portions indicated in dotted lines, and 16 in the final S3 stage including the portions shown in dotted lines. Sixteen signal inputs are fed individually to each of the space switches 79 in the first stage S1, thereby providing for 256 data inputs to the time divided space switch. Sixteen outputs of each first stage S1 space switch 79 are individually cross-connected to inputs of space switches 79 of the second stage S2 that are, in like manner, cross-connected to inputs of space switches 79 of the third stage S3, from each of which 16 TDM outputs are provided to total 256 data outputs, in all, from the space switch. READ line 78′″ from marker control circuitry 50C is fanned out selectively to 16 READ lines 78″ for individual space arrays 79 of a switch stage through the switching mechanism of 1 to 16 selectors 82′, in parallel, for the three stages S1, S2, and S3. WRITE line 72″ from marker control circuitry 50C is fanned out selectively to sixteen WRITE lines 72′, for individual space switches of a switch stage through the switching mechanism of 1 to 16 selectors 83′, in parallel, for the three stages S1, S2, and S3. The S1, 1 to 16 selector 82′ is used in selecting status for the first stage S1 for an entire array $i/n$ by enabling appropriate 16-bit gates under control of address bits $A_0$–$A_3$ through four line bus 87 that has a bus branch 88 extended to connection with the 16 × 16 space switches 79 of the second space stage S2 and the connection with both 16 to 1 selector 89 and 1 to 16 selector 90. The first time stage T1 of TST switch 86 consists of sixteen 16-element time switch arrays 91, and the second time switch stage T2 consists of sixteen 16-element time switch arrays 92 with corresponding elements of each time stage implemented in a common module so they can share common control stores. This physical implementation of the switch reflects the nature of the folded operation employed. Branches of the WRITE and READ lines 72′ and 78″ connected to the S1 stage space switches 79 are also connected to the T1 stage time switch arrays 91. Please note that the 16 element time switch arrays 91 of the first time stage T1 and 92 of the second time stage T2 are build-ups of the respective related time switch elements, the counterpart of space switch build-ups shown in greater block schematic detail in FIG. 12 and described further hereinafter. Disconnect signals are fed from the T1 stage time switch arrays 91 through 16 line groups 93 to the marker control circuit 50C, and channel number signal path information $D_0$–$D_6$ is fed back and forth from the time switch arrays 91 to the marker control circuit 50C through seven-line bus 94. $D_7$–$D_{13}$ disconnect control data is fed from the T2 time switch arrays 92 through seven line bus 95 to the marker control circuit 50C. The $A_4$–$A_7$ address bus is interconnected between the marker control circuit 50C and the time switch arrays 91 of the T1 stage, the space switches 79 of the first stage S1, and the space switches 79 of the third space stage S3, through a branch of four-line bus 96.

Within the space staging section of the S1 switch 86 gates 97, as activated by branches of respective READ lines 78″, gate S1($i/n$,*) status out from selected individual elements 41 of the respective arrays 79 through 16 line bus 98 to marker control circuit 50C. The $A_8$–$A_{11}$ four-line address bus 99 provides a two-way address specification interconnect between marker control circuit 50C and the S2 stage 1 to 16 READ and WRITE selectors 82′ and 83′, to S1 stage arrays, 79, and to S3 stage arrays 79. The $A_{12}$–$A_{15}$ address bits control signals passed from marker control circuit 50C through four-line bus 100 is connected to the S2 stage arrays 79 and through the control bus branch connection of buss 100 to 16 to 1 selectors 101 to provide status output in selecting the respective output ($i/n$) of each array 79 in S2 passed from the selectors through lines 102 to the marker control circuit 50C. The four-line bus 100 also has a branch connection to the READ and WRITE 1 to 16 selectors 82′ and 83′ of the third and final space stage S3. With the last space stage S3, $A_{16}$–$A_{19}$ address information is supplied from marker control circuit 50C through four-line bus 103 to the space switch arrays 79 of the S3 stage, and has bus branch connections for control of 16 to 1 selectors 104 having output connections as inputs to respective AND gates 105. Line branches of READ lines 78″ out of the 1 to 16 selector 82′ of the S3 stage are connected as the additional input to the AND gates 105. This is used in selecting and gating S3(j) status output signals on the 16 line bundles 106, from each S3 stage array 79 to respective T2 stage 16 element time switch arrays 92, having branch connections as inputs to the 16 to 1 selectors 104, to and through line 107 to marker control circuit 50C. The status' lines 65' are signal selected through 16 to 1 selector 89 and passed through line 108 as the $T_1(i)$ status' input to marker control circuit 50C. Disconnect signalling is passed out of marker control circuit 50C through line 76' to each of the S1, S2, and S3 space switch arrays 79 through branch lines 76, back to the stored program controller 109 through branch line 110, and to 1 to 16 selector 90 that feeds disconnect' lines 71' to the S3 stage arrays 79. Data output from the S3 stage arrays 79 is fed through 16 line bundles 111 to T2 stage time switch arrays 92 having 16 line TDM outputs.

Request data is fed through 30 line bundle 112 from the stored program controller 109 to the marker control circuit 50C, and disconnect data is fed back from circuit 50C to stored program controller 109 through 30 line bundle 113. Connect request signals pass from controller 109 to marker control circuit 50C through line 114, and path search information is passed back through line 115 and through inverter 116 to line 78A' which is connected to every space stage array 79 as the READ ENABLE input 78A (shown in FIG. 10). Path preference is passed through line 117 to marker circuit 50C from controller 109. Bit clock 118, in addition to connection to the marker control circuit 50C, is connected to the time module arrays 91 and 92, along with connection of reset line 119 and outlet reset line 120 to the T1 and T2 arrays 91 and 92, although not completely shown in FIG. 11, for drawing clarity. In like manner, word clock is supplied from the marker control circuit 50C stored program controller 109 through line 66' for all of the TST switching arrays and elements. In addition strobe is supplied through line 121, I/O word clock through line 122, and CTR/CS through line 123 from marker control circuit 50C to every time switch module.

Referring also to FIG. 12, greater detail of inlet and outlet time switch element memory circuitry is shown with, in this instance, a sharing of a common control store for folded operation. Here again, as with the space switch shift register 43 of FIG. 9, control store 124 is an end around shift register composed of three sections 1 × 7 shift register 124A, 142 × 7 shift register 124B, and 1 × 7 shift register 124C, in order to provide access to specific control information at the interconnects between sections required for automatic connect and disconnect operation. The 144 × 7 end around shift register control store 124 has its 1 × 7 section 124C connected through seven-wire recirculation loop 125 to gate 126, and through gate 126 and seven-line bus 95 to control circuitry 50D, and also through a seven-wire branch 125A to gate 127, and through gate 127 and seven-wire bus 128 to the 1 × 7 input section 124A of end around shift resister 124. Channel number signal path information $D_0$–$D_6$ is fed through two-way bus 94, gate 129 and seven-wire bus extension 130 to a connection with seven-wire bus 128 from control circuitry 50D. Disconnect signals are passed through line 71' from control circuitry 50D to gate 126, and write signals are passed through line 72 from control circuitry 50D, to gate 129 and also to, and through, inverter 131 to gate 127. The seven-wire bus 132 output of 1 × 7 shift register section 124A is connected as an input to 142 × 7 shift register section 124B, and the bus 132 has a seven-wire branch 133 connection through gate 134 to a connection with seven-line bus 135. The seven-wire bus 136 output of the 142 × 7 shift register section 124B of control store 124 is connected as an input to 1 × 7 shift register section 124C, and the bus 136 has a seven-wire branch 137 connection through gate 138 to seven-wire bus 139 as the control store signal connection to 128 × 9 inlet memory circuit 140. Bus 136 also has a seven-wire branch 141 connection through gate 142 and seven-wire bus 135 to a connection with seven-wire bus 143 that provides for signal flow from bus 135. One direction of signal flow from bus 135 is down through bus 143 as gated through gate 144, and on through bus 145 to bus 94, as read signal gate controlled through line 78 from control circuitry 50D, and through bus 94 to control circuitry 50D. The other direction of signal flow from bus 135 is upward through bus 143 as passed through latch 146, seven-wire bus 147, gate 148, and seven-wire bus 149 as the control store time switch control word signal connection to 128 × 9 outlet memory circuit 150.

Word clock is fed from line 66' directly to the control store shift register sections 124A, 124B, and 124C for progressively stepping the control store shift register system 124. Outlet reset is applied through line 120 from stored program control circuit 109 to counter 151, and CTR/CS signalling from marker circuit 50C is passed from line 123 to counter 151, gate 152, through inverter 153 to latch 146 and gate 148, and to AND gate 154 that is output line 155 connected as a write enable input to 128 × 9 outlet memory 150. The CTR/CS signalling from line 123 is also applied to counter 156, gate 157, through inverter 158 to gate 138, and through inverter 159 to 128 × 9 inlet memory 140 and to AND gate 160. Reset signal line 119 from the stored program control circuit 109 is connected as an input connection for reset of counter 156 that has a seven-wire bus 161 connection to and through gate 157, and on through seven-wire bus 162 to connection with bus 139 and thereby to the inlet memory 140. The strobe line 121 from marker circuit 50C is connected as the strobe input to both inlet and outlet memories 140 and 150, and also to AND gate 160. The ouput of AND gate 160 provides CTR/CS and strobe ANDED control of latches 163 and 164, T1 stage 1 × 8 shift register 165, and flip-flop 166. The T2 latch 163 also receives a status input through line 106' from space stage S3, and data from the space switch through line 111' that is also applied as an input to T2 stage 1 × 7 shift register 167. Bit clock is applied from stored program control circuit 109 through line 118 to the T2 stage 1 × 7 shift register 167, T2 stage data output shift register 168, T1 stage incoming TDM data receiving 1 × 8 shift register 169, and T1 stage data output shift register 165. The T1 stage incoming TDM data line 170, in addition to 1 × 8 shift register 169, is connected as an input to latch circuit 171 that is loaded by I/O word clock input through line 122 from the marker circuit 50C along with the eight-wire bus 172 input from 1 × 8 shift register 169. Eight bits of current data stored in 1 × 8 shift register 169 are added to a disconnect bit to store nine bits in latch 171, a nine flip-flop circuit with output connected through nine-wire bus 173 as data input to 128 × 9 random access inlet memory 140. Message data output from the 128 × 9 inlet memory 140 is applied through eight-wire bus 174 to 1 × 8 shift register 165 from which the data is passed through line 175 to the space switch. A disconnect bit is passed through line 176 to flip-flop 166. The successive disconnect bits are stored in flip-flop 166, subject to CTR/CS and strobe ANDED control of the flip-flop 166, and applied through line 177 to AND gate 178, having status' line 65' as the other input thereto to provide disconnect signals on line 71 back to control circuitry 50D. The 128 × 9 random access outlet memory 150 output nine bits are applied through nine-wire bus 179 to latch 164, a nine flip-flop circuit. Latch 164 output data is transferred through nine-wire bus 180 to 1 × 9 shift register 168 by action of I/O word clock line 122. Finally, TDM data out of 1 × 9 shift register 168 is stepped out in serial form on outgoing data line 181 in accord with bit clock on line 118.

It should be noted that the least significant bit of time slot counter 151 is connected via a tap line 182, from the least significant bit wire of seven-wire bus 183 connecting counter 151 to gate 152, as the controlling input to gate 134 and through inverter 184 and a line as the controlling input to gate 142. The output of gate 134 is passed through seven-wire bus 185 to connection with seven-wire bus 135. The seven-wire bus 186 out of gate 152 extends to a connection with seven-wire bus 149 for gate-controlled address bus feeding the outlet memory 150.

The inlet memory and outlet memory T1 and T2 stages share the common control store 124 for folded TST two-way switched TDM communications with the control word addresses for the inlet memory obtained one time slot ahead of the actual transfer. A timing diagram in FIG. 13 is shown for the controlling inputs bit clock, I/O word clock, CTR/CS, and strobe for the time stages T1 and T2 of a TST switch with time element equipped stages such as shown in FIG. 12.

While the switch description presented is for a specific TST switch with three space sections, the same basic concepts can be applied to any size of digital time division switches and many configurations thereof. In the TST switch 86 of FIG. 11, the first time stage T1 consists of sixteen 16-element time switch switch arrays 91 and the second time stage T2 consists of sixteen 16-element time switch arrays 92. Both time stages are implemented in a common module reflecting the nature of folded operation with a sharing of a common control store as shown in FIG. 12.

Status for the first space stage S1 is selected for an entire array $i/n$ by enabling an appropriate 16-bit gate 97 under control of address bits $A_0-A_3$. The selected status bits $S1(i/n,\phi)$, $S1(i/n,1)$ ... $S1(i/n, 15)$ are gated onto status bus $S1(i/n, *)$ whenever the READ line is a 1. Status for the second space stage S2 is obtained by selecting the same respective output $(j/n)$ from each of the 16 arrays under control of address bits $A_{12}-A_{15}$. The status bits so selected are supplied to the MARKER as inputs $S2(\phi,j/n)$, $S2(1,j/n)$ ... $S2(15,j/n)$ which are designated collectively as $S2(*,j/n)$. Status $S3(j)$ for the $j$th element of the third stage S3 is obtained by applying $j$ to address lines $A_{12}-A_{19}$.

Status of second time stage T2 is implied by status of the respective link from S3, since there is a one-to-one connection between the two stages. Thus, $T2(j)=S3(j)$. Status of time stage T1 is obtained as status of respective inputs to T2 in opposite time slots as provided in a folded operation. Thus, status of the $i$th inlet is obtained from the third space stage on line $T1(i)$ when the value $i$ is applied to address lines $A_0-A_7$.

Referring also to the marker circuit 50C of FIG. 14, connect requests are fed through 30-wire connect request data bus 112 to connect request register 187. Register 187 is a 30 flip-flop circuit storing values for $a_1$, $i,j$, and $a_2$, respectively, on seven-wire bus 188, eight-wire busses 189 and 190, and seven-wire bus 191. Bus 188 and busses 189 and 190 are connected to and through gate 192 and on through seven-wire bus 193 and eight-wire busses 194 and 195, respectively, to connection with $D_0-D_6$ bus 94, the eight-wire combined $A_0-A_7$ bus 84–96, and the eight-wire combined $A_{12}-A_{19}$ bus 100–103. Busses 189 and 190 are, additionally, along with bus 191, connected to and through gate 196 and on through eight-wire busses 197 and 198 and seven-wire bus 199, respectively, to connection with eight-wire combined $A_{12}-A_{19}$ bus 100–103, the eight-wire combined $A_0-A_7$ bus 87–96, and the seven-wire combined $D_0-D_6$ bus 94. The buses 94, 87–96, 100–103, and 95 are connected as inputs to the $a_1$, $i,j$, and $a_2$ sections, respectively, of the 30 flip-flop connect complete register circuit 200 that feeds disconnect data to 30 wire disconnect data bus 113. Gates 192 and 196 are subject to control by AND gate circuit 201 with an "even/odd" signal line 202 and "bus enable" signal line 203 connected from control and timing circuit 204 thereto. Even/odd signal line 202 is connected as an input to AND gate 205 and through inverter 206 as an input to AND gate 207, and the bus enable line 203 is connected as an input to both AND gates 205 and 207 of AND gate circuit 201. Thus, connect requests received by the connect request register 107 of marker circuit 50C are passed therefrom to designated control stores in TST switching elements. This is accomplished with setting up a call by the marker circuit 50C selectively gating data from the connect request register onto data line $D_0-D_6$ of bus 94 and address lines $A_0-A_7$ of bus 87–96 and lines $A_{12}-A_{19}$ of bus 100–103.

To effect a pathfinding operation from channel $a_1$ of inlet $i$ to channel $a_2$ of outlet $j$, $a_1$ is applied to $D_0-D_6$, $i$ is applied to $A_0-A_7$, and $j$ is applied to $A_{12}-A_{19}$, during even time slots. If an idle path is found, a write operation is performed and $a_2$ is applied to $D_0-D_6$, $i$ is applied to $A_{12}-A_{19}$, while $j$ is applied to $A_0-A_7$ during the following (odd) time slot. At this time another write operation is performed to complete both halves of the connection.

Latch 208 provides for transfer of data on the $A_0-A_7$ bus 87–96 lines to the $A_{12}-A_{19}$ bus 100–103 lines as controlled by latch out signals and latch in signals on latch control lines 209 and 210 from control and timing circuit 204. Disconnect selection logic circuit 211 is fed disconnect requests from bus 93' to develop encoded disconnect outputs on eight-wire bus 212 connected to $A_{12}-A_{19}$ bus 100–103 with disconnect requests fed through line 213 to the control and timing circuit 204 from which request acknowledge signals are fed back to circuit 211 through line 214.

Path search logic circuit 215 receives inputs T1 (1) through line 108, $S1(i/n,*)$ inputs through bus 98, $S2(*,j/n)$ inputs through bus 102; and $S3(j)$ input through line 107 along with a path preference input through line 117 and bus enable input through line branch 216 from line 203 to develop $A_8-A_{11}$ outputs to bus 99 and path available line 217. The path search logic circuit 215, as shown in FIG. 15, is a 16 to 4 priority encoder circuit using two 8 to 3 priority encoders 218A and 218B. (These are commercially-available 8 to 3 priority encoders such as T.I.-SN54148's.) Status lines $S1(i/n, \phi)$ through $S1(i/n, 7)$ of 16-wire bus 98 are paired, respectively, with status lines $S2(\phi, j/n)$ through $S2(7, j/n)$ of 16-wire bus 102 as inputs by pairs to AND gates 219A through 219G that are output connected through lines 220A through 220G to 8 to 3 priority encoder 218A. In like manner, status lines S1($i/n$, 8) through S1($i/n$, 15) are paired, respectively, with S2(8, $j/n$) through S2(15, $j/n$) as inputs by pairs to AND gates 221A through 221G that are output connected through lines 222A through 222G to 8 to 3 priority encoder 218B. The $A_9$ output lines 223A and 223B, $A_{10}$ output lines 224A and 224B, and $A_{11}$ output lines 225A and 225B, respectively, of 8 to 3 priority encoders 218A and 218B are connected to three state inverters 226A, 226B, 227A, 227A, 227B, 228A, and 228B useful as three state bus drivers. This is with the outputs of inverters 226A and 226B joined together in $A_9$ bus line 229, inverters 227A and 227B joined together in $A_{10}$ bus line 230, and inverters 228A and 228B joined together in $A_{11}$ bus line 231. The three state inverters 226A, 227A, and 228A are enabled through enable input 232A, 233A, and 234A, driven in parallel through output 235A of enable drive circuit 236, and, in like manner, inverters 226B, 227B, and 228B are enabled through enable inputs 232B, 233B, and 234B, driven in parallel through output 235B of enable drive circuit 236. Enable output (EO) lines 237A and 237B as the fourth outputs of priority encoders 218A and 218B are connected, respectively, encoder 218A as an input to inverter 238 and OR gate 239, and encoder 218B as an input to OR gate 239 and AND gate 240. The output of inverter 238 is connected, along with path preference line 117, as an input to OR gate 241 having an output connection to AND gate 240. The AND gate 240 has an output connection from line 235B to and through inverter 242 to AND gate 243 and to three-state inverter 244 that acts as a driver for the $A_8$ bus line 245. Bus enable signals are fed from line 216 to both AND gates 240 and 243 in enable drive circuit 236,, and also as the enable input to three-state inverter 244.

The output line 246 of OR gate 239 is ANDED along with T1($i$) and S3($j$) in three-input AND gate 247 to provide path available logic signals on path available line 217 out of AND gate 247. The path search logic with the circuit of FIG. 15 implements the following Boolean equation in status variables where path available (PA) is a 1 when an idle path exists:

PA=T1($i$)[S1($i/n,\phi$) S2($\phi,j/n$)+ . . . S1($i/n$,15) S2(15,$j/n$)]T2($j$)

If one or more idle centerstage exists, the priority encoding logic selects a single stage ($s$) and encodes it onto address lines $A_8$–$A_{11}$. As shown, The 16 to 4 priority encoder is implemented using two 8 to 3 priority encoders. Access to address lines $A_8$–$A_{11}$ is controlled by the bus enable input 216. It should be noted at this point that the AND gate 81A of FIG. 10 is to disable control store access to the data bus 57' during path search operations. The path preference input 117 selectively gives preference to outputs 223A, 224A, 225A, of 8 to 3 encoder 218A when in a logic 0 state. Preference is given to outputs 223B, 224B, 225B, of 8 to 3 encoder 218B when path preference input 117 is logic 1. Thus, input 117 from stored program controller 109 allows path search operations to selectively begin in the upper or lower half of center stage space switch S2.

Referring now to the disconnect selection logic circuit 211 of FIG. 16, the 16-wire disconnect signal buses 93 of FIG. 11 are divided into eight-wire buses, each, to constitute 32 disconnect eight-wire buses 248, giving 256 disconnect signal lines input to the 8 to 3 priority encoders 249 of the logic circuit 211. The logic circuit uses a hierachy of 8 to 3 priority encoders to realize the required 256 to 8 priority encoding function. Thirty-two of the 8 to 3 priority encoders 249 in four groups of eight each have enable output (EO) lines 250 connected as the inputs of respective 8 to 3 priority second-level encoders 251 (like encoders 249 and 218). The second level encoders 251, in turn, supply their enable outputs (EO) to a third-level 4 to 2 encoder 252 through the four EO lines 253. The 4 to 2 encoder 252 is implemented using the same standard IC commercially available encoder as used for encoders 249, 218, and 251, and the enable output (EO) is fed to the disconnect request signal line 213. The 8 to 3 priority encoders 249, in each of the four groups of eight each, have three-line bus 254 outputs connected as inputs to respective one of four 3-bit 8 to 1 multiplexers 255, with each multiplexer (MUX) having a three-wire output bus 256 connection as one of four bus 256 inputs to 3-bit 4 to 1 multiplexer 257. Multiplexers 255 (only two of four shown) are such as can be provided by three commercially available SN5451's and multiplexers 257 and 258 that are both 3-bit 4 to 1 multiplexers having three-state three-wire output buses 259 and 260, respectively, are such as can be provided by SN54253 IC's. The three-wire output bus 261 of each second-level 8 to 3 priority encoder 251 has a branch 262 for controlling the respective 3-bit 8 to 1 multiplexer 255, and is also one of four bus 261 inputs to 3-bit 4 to 1 multiplexer 258. The two output lines 263 and 264 of 4 to 2 priority encoder 252 are both connected as selection inputs to both multiplexers 257 annd 258, and also, respectively, as data inputs to the three-state $A_{12}$ bus line 265 driver 266 and to the three-state $A_{13}$ bus line 267 driver 268. Enable inputs 269, 270, 271, and 272, connect request acknowledge signal line 214 to three-state drivers 266 and 268 and multiplexers 258 and 257.

Each of the 32 first-level encoders 249 receives 8 disconnect signals as inputs. If a disconnect signal is present on one or more inputs in a set, the respective three outputs are encoded to designate the highest priority of the signals present. Each 8 to 3 encoder 249 provides an enable output (EO) which is logic 1 whenever at least one of its respective disconnect signal inputs is present (at logic 1). Four groups of 8 EO outputs are supplied to a second level of encoding where four more 8 to 3 encoders 251 are used to detect and select disconnect signals from the first level. These four encoders, in turn, supply their EO outputs to the third-level 4 to 2 encoder 252, where a single disconnect signal is selected. The EO output, disconnect request, of this level is then a 1 whenever one or more disconnect signals are present.

The three-line bus 261 outputs of each second-level encoder 251 are used to control a 3-bit 8 to 1 multiplexer (MUX) that selects the bus 254 outputs of the respective first-level encoders 249. Similarly, the two outputs of the third level are used to select encoded outputs from one of the four groups in the second level. Thus, two 3-bit 4 to 1 multiplexers 257 and 258 are required to select these lower level outputs. As indicated in FIG. 16, these multiplexers have three-state outputs. In addition, the third-level outputs are gated through three-stage buffers 266 and 268 by a request acknowledge input so that access to the address bus $A_{12}$–$A_{19}$ (212 in FIG. 14) can be controlled.

When a disconnect request from inlet i occurs during an even time slot, the disconnect selection logic loads the value i on address lines $A_{12}$–$A_{19}$. The connection is then traced in reverse fashion by successively reading control stores in the manner described previously. When the connection has been traced, the opposite end of the connection (j) is designated by address lines $A_0$–$A_7$ (refer to FIGS. 11 and 14). The value j is then stored in a latch of FIG. 14 until the following (odd) time slot. At this time, the value j is applied to address lines $A_{12}$–$A_{19}$ and the connection is traced in the opposite direction. When the trace operation is complete, a disconnect signal is generated that sets all appropriate control store words to idle.

When disconnects originate during an odd time slot, the value j is encoded by the disconnect selection logic and applied directly to address lines $A_{12}$–$A_{19}$. The connection is then traced and a disconnect signal is generated to set the appropriate control store words to idle.

Switch and marker operation timing control waveforms are shown in FIG. 17 that are supplemental to the waveforms of FIG. 13 wherein two strobe pulses are supplied with every inlet memory write/read cycle (and read/write cycle of an outlet memory). The first strobe of each cycle effects a load into the inlet memory while the second loads memory data into the parallel to serial converter 165 for subsequent transfer through the switch. Thus, inlet memories are accessed for data in the time slot prior to the time slot in which the space switch transfer takes place. Serial data from the space switch is transferred into serial-to-parallel converter 167. Data is strobed into the outlet latch 163 as soon as the eighth bit is available on input line 111'. Data is then held in latch 163 until the second half of the next switch time slot when it is transferred into the outlet memory. Thus, outlet memory writes coincide with inlet memory reads. Hence, inverter 159 is used to change the sense of the CTR/CS control signal for inlet memories. Outlet memory writes are enabled only by the output of gate 154, however, when the current time slot is in use as designated by the ninth bit from latch 163 status = 1. The control and timing logic circuit 204 of FIG. 14, shown in detail in FIG. 18, generates the various timing signals of FIG. 17. Circuit 204 is implemented using counters and sequential logic to generate the various control pulses from the single clock source bit clock that runs at the basic data rate used to transfer data through the space switch (9.216 mbps). When a write operation is to be executed, a pulse is generated during a time slot transition as shown by the dotted pulses above the respective waveform link in FIG. 17. Similarly, when disconnects are executed, pulses as shown in dotted lines above the disconnect line are generated to coincide with the work clock. Disconnect requests that occur during even time slots are stored in logic circuitry that then produces a request acknowledge signal and enables the generation of a latch in pulse (dotted) at the end of the even time slot as shown in FIG. 17. This operation stores the source of a disconnect request in latch 208. The latch out signal is subsequently generated by additional logic circuitry in the following (odd) time slot to enable the loading of latch data onto $A_{12}$–$A_{19}$ lines 100–103.

The control and timing logic circuit 204 of FIG. 18 is implemented using counters and sequential logic in generating the various control pulse signals from a single source bit clock input on line 118. The bit clock signal on line 118 is applied as the clock input to four element counters 273 and 274, and also to the clock terminals of all the J-K Flip-flops in the circuit 204 as symbolized by the arrowed branches 118A and 118B. Three of the true outputs of counter 274 are inputs to three input AND gate 275 output connected to the J terminal J-K flip-flop 276, and the fourth T output of counter 274 is directly connected to the K terminal of the flip-flop 276. The Q output of flip-flop 276 feeds I/O word clock to line 122 and also back through line 277 to the reset terminal R of counter 274 and through line 278 to AND gate 279.

The T output of the third element of counter 273 is connected to inverter 280 for supplying the CTR/CS signal output to line 123. This third element T output is also connected along with the second element T output and the first element F output to AND gate 281 output connected to the J terminal of J-K flip-flop 282, also having a K terminal input from the first element T output of counter 273 to produce a Q terminal word clock output on line 66'. The word clock line 66' has a branch line connection 283 to AND gate 279, AND gate 284, and to the K terminal of J-K flip-flop 285. The F output of the first element of counter 273 and the T outputs of the second and third elements are connected to AND gate 286 output connected to the J terminal of J-K flip-flop 287. The K input of flip-flop 287 is from AND gate 288 that has inputs from the F outputs of the first and second elements of counter 273. The Q output of the flip-flop 287 is connected to AND gate 289 having a write signal output feeding line 72". The second input of AND gate 289 is through line 292, from the Q output of J-K flip-flop 293, that is also connected as an input to the K terminal of J-K flip-flop 294 and inverter 295 to feed read signal output to line 78'''. The F output of the first element of counter 273 and the T output of the second element of counter 273 are connected to AND gate 290 output connected to the J terminal of J-K flip-flop 291. The T output of the first element of counter 273 is also connected to the K input of J-K flip-flop 291, having the Q output terminal feeding the strobe signal to line 121. A four-input AND gate 296 receiving the first element F and second, third, and fourth T outputs of counter 273 as inputs is connected as the J input to J-K flip-flop 297. The K input connection to flip-flop 297 is from AND gate 298 receiving the F outputs of first and second elements in counter 273 as inputs thereto, and the corresponding Q output is connected through line 299 and AND gate 300 feeding a disconnect signal output to line 110.

The F output of the fourth element of counter 273 is connected as an input to AND gate 303 and to and through inverter 304 as an input to AND gate 305. The other inputs to AND gates 303 and 305 are obtained from the T and F outputs, respectively, of five-stage counter 306. The outputs of AND gates 303 and 305 are connected as inputs to OR gate 307 developing even-/odd output signals fed to line 202. The fourth element F output is also connected as an input to AND gate 308, connected as the J input to J-K flip-flop 293, to AND gate 284, to AND gate 309, connected as the J input to J-K flip-flop 285, to and through inverter 310 as an input to AND gate 311, connected as the J input to J-K flip-flop 312, to the K input to both J-K flip-flops 312 and 313, and also as input to AND gate 314, connected as the K input to J-K flip-flop 293. The other input to AND gate 314 is obtained as the F output from the third stage of counter 273. The connect request signal of line 114 is connected as an input to the J input to J-K flip-flop 294 and path available signals on line 217 are fed to AND gate 308. Thus, the Q output of flip-flop 294 is caused to feed path search signals to path search line 115 and to AND gate 317 which also receives other inputs from the Q outputs of flip-flops 285, 312, and 313. The output of AND gate 317 develops bus enable signal output on line 203 and is also connected to AND gate 308. Disconnect request line 213 is connected as an input to AND gates 309 and 311, connected as the J inputs to flip-flops 285 and 312, respectively. The Q output of flip-flop 312 is applied as an input to OR gates 318 and 319. The resulting Q output of flip-flop 285 is connected to OR gate 318 and as one of three inputs to AND gate 284 that feeds latch in signals to line 210 and the J terminal of J-K flip-flop 313. OR gate 318 feeds request acknowledge signals to line 214. The Q output of flip-flop 313 feeds latch out signals to line 209 and to OR gate 319 output connected as an input to AND gate 300 that feeds disconnect signals to line 110.

Connect requests are stored in flip-flop 294 that raises the bus enable output via AND gate 317 except when disconnects are being processed. The bus enable output loads the connect request data onto the address buses to begin the path search operation. If an idle path is signified by the path available input durng the latter half of an even time slot, flip-flop 293 is set to enable write outputs and disable read outputs. Flip-flop 293 is reset at the end of the next odd time slot and thereby allows two write pulses to be generated at the end of successive even and odd time slots. Five-bit counter 306 counts coincidences of I/O word clock and word clock signals, which occur every nine time slots. The last stage of counter 306 thus changes state after every frame (144 time slots). This change of state causes the sense of even/odd output to alternate after every frame so that source and destination are interchanged as the output is applied to the address buses. In disconnect functioning, disconnect requests that occur during odd time slots are accepted and stored in flip-flop 312 only if a connection set up is not in progress. When odd time slot disconnect requests are accepted, flip-flop 312 remains in the request acknowledge signal state until the trailing edge of the disconnect signal. Disconnect requests occurring during even time slots are stored in flip-flop 285 that produces a request acknowledge signal and enables the generation of a latch-in pulse at the end of the even time slot that results in the storing of the source of a disconnect request in latch 208. Subsequently, a latch-out signal is generated by flip-flop 313 in the following odd time slot to enable loading of latch data onto bus $A_{12}$-$A_{19}$.

Thus, there is herein provided a hardwired marker circuit system for TST switches having an improved "folded" operation configuration with connect and disconnect procedures simplified, since a second path is automatically specified whenever the first path is selected for a circuit. Only one pathfinding operation is required in a folded switch for establishing both paths in a completed circuit through the switch and disconnect is simplified with both paths being released simultaneously. Blocking problems are cut in half with a second path through the switch automatically available when a first path is found, and control information for two paths of a call being shared results in some economy in the size of the control store structure. The hardwired marker circuit achieves automatic connection set up in accordance with time folded operation, responds to disconnects in automatically updating appropriate control stores, and generates the necessary control signals for time folded switch operation. Call processing load is reduced and thereby the switch processor can be concerned primarily with specialized service requests.

Whereas, this invention is herein illustrated and described with respect to several embodiments thereof, it should be realized that various changes can be made without departing from essential contributions to the art made by the teachings hereof.

We claim:

1. In a time folded time space time switch for interconnecting digital time division multiplex communication lines: hardwired marker circuit means that includes, switch time stage busy/idle status sensing means interconnecting time stage means of said time space time switch with said marker circuit, switch space stage busy/idle status sensing means interconnecting space stage means of said time space time switch with said marker circuit, clock means connected to supply timing signals to said marker circuit means, path search logic means in an automatic path finding, set up and release circuit means in said switch setting up and releasing transmission paths through the switch, with said path search logic means locating an idle path and path disconnect selection logic means connected to said automatic path finding, set up and release circuit for achieving desired circuit path disconnect as initiated by the time stage disconnect signals.

2. In the time folded time space time switch of claim 1, said space stage means being a plurality of space stages including a last space stage having a plurality of switch crosspoints; inlet time stage memory elements, and outlet time stage memory elements; and control store means individually connected with each of said switch crosspoints capable of storing the status of respective switch crosspoints and the status of the associated inlet time stage and outlet time stage memory element pairs of switch elements.

3. In the time folded time space time switch of claim 2, said space stage means including three space stages.

4. In the time folded time space time switch of claim 1, said space stage means being a single space stage having a plurality of switch crosspoints; inlet time stage memory elements, and outlet time stage memory elements; and control store means individually connected with each of said switch crosspoints capable of storing the status of respective switch crosspoints and the status of the associated inlet time stage and outlet time stage memory element pairs of switch elements.

5. A time space switch for interconnecting digital time division multiplex communication lines comprising: time switch element means; space stage switch element means; time switch element busy/idle status sensing means; space stage switch element busy/idle status sensing means; hardwired marker circuit means; hardwire interconnect means interconnecting said marker circuit means to both said time switch element means and said space stage switch element means; clock source means; clock signal distribution means from said clock source means to control circuit means of said marker circuit means and to both said time switch element means and said space stage switch element means; signal path selection means in said marker circuit means; marker control means in said marker circuit means; path set up means in said marker circuit means; and disconnect processing means in said marker circuit means implementing hardwired path finding set up and disconnect operations by signal inputs to both time and space switch element control stores from said hardwired marker circuit means and disconnect requests from said time switch element means.

6. The time space switch of claim 5, wherein said time space switch is a time space time switch with two time switch stages; and with said time switch element means contained within each of said time switch stages.

7. The time space switch of claim 5, wherein said switch is a time folded time space time switch with space switch folded operations control logic means included with said address and control marker circuit means for automatic folded operation of said time space switch.

8. The time space time switch of claim 1, wherein said hardwired marker circuit means is connected to a stored program controller means from which said marker circuit receives connection set up information for establishing time folded connections through time and space stages of the switch in an automated manner.

9. The time space time switch of claim 8, including time switch element status sensing means and space stage switch element status sensing means connected as control input sources to said marker circuit.

10. The time space time switch of claim 9, including signal path selection means with pathfinding logic means within said marker circuit.

11. The time space time switch of claim 10, wherein a priority encoder is provided with pathfinding logic means to select one path from a multiple number of available paths for each individual pathfinding operation.

12. The time space time switch of claim 11, wherein control logic means directs reassignment of priorities in giving path set up precedence to selectable sections of the switch.

13. The time space time switch of claim 10, with control store means for individual time and space switch elements; and control address and data bus communication means interconnects said marker circuit with said control store means of individual time and space switch elements.

14. The time space time switch of claim 13, with disconnect processing means implemented as a priority encoder to select one disconnect signal from a multiple number of such signals.

15. The time space time switch of claim 14, with disconnect signalling means in marker control means connected through control data and address buses to said switch element control stores for updating of the switch element control stores.

16. The time space time switch of claim 8, with said space stage having an input side and an output side; and with said two time switch stages including input time staging connected to the input side of said space stage, and output time staging connected to the output side of said space stage; and with said input side being the source of disconnect signals.

17. The time space time switch of claim 16, with said space stage having a plurality of space stage sections.

18. The time space time switch of claim 8, with combined control and timing circuit means contained in said marker circuit means for coordinating the operation of said marker circuit means with the operation of time switch means and space switch means.

19. The time space time switch of claim 8, with register storage means included in said marker circuit means for holding connect request information from said stored program controller means during time intervals while path set up operations are performed by said marker circuit means.

20. The time space time switch of claim 19, with second register storage means for transferring switch element disconnect information to said stored program controller means.

21. The time space time switch of claim 6, with said space stage means being a plurality of space stages including a last space stage having a plurality of switch crosspoints; inlet time stage memory elements, and outlet time stage memory elements; and control store means individually connected with each of said switch crosspoints capable of storing status of respective switch crosspoints and the status of the associated inlet time stage and outlet time stage memory element pairs of switch elements.

22. The time space time switch of claim 21, with said space stage means including three space stages.

23. The time space time switch of claim 6, with said space stage means being a single space stage having a plurality of switch crosspoints; inlet time stage memory elements, and outlet time stage memory elements; and control store means individually connected with each of said switch crosspoints capable of storing status of respective switch crosspoints and the status of the associated inlet time stage and outlet time stage memory element pairs of switch elements.

* * * * *